(12) United States Patent
Jeffrey

(10) Patent No.: US 12,294,751 B2
(45) Date of Patent: May 6, 2025

(54) SYSTEMS AND METHODS FOR MONITORING CONTENT DISTRIBUTION

(71) Applicant: Adeia Guides Inc., San Jose, CA (US)

(72) Inventor: Michael Richard Jeffrey, Orinda, CA (US)

(73) Assignee: ADEIA GUIDES INC., San Jose, CA (US)

( * ) Notice: Subject to any disclaimer, the term of this patent is extended or adjusted under 35 U.S.C. 154(b) by 185 days.

(21) Appl. No.: 16/618,983

(22) PCT Filed: Jun. 8, 2017

(86) PCT No.: PCT/US2017/036537
§ 371 (c)(1),
(2) Date: Dec. 3, 2019

(87) PCT Pub. No.: WO2018/226232
PCT Pub. Date: Dec. 13, 2018

(65) Prior Publication Data
US 2020/0145706 A1     May 7, 2020

(51) Int. Cl.
*H04N 21/24* (2011.01)
*H04H 20/74* (2008.01)
(Continued)

(52) U.S. Cl.
CPC ........ *H04N 21/2408* (2013.01); *H04H 20/74* (2013.01); *H04N 21/237* (2013.01); *H04N 21/238* (2013.01); *H04N 21/8547* (2013.01)

(58) Field of Classification Search
CPC ............. H04N 21/2408; H04N 21/237; H04N 21/238; H04N 21/8547; H04N 21/47217;
(Continued)

(56) References Cited

U.S. PATENT DOCUMENTS 6,239,794 B1   5/2001 Yuen et al.
6,388,714 B1   5/2002 Schein et al.
(Continued)

OTHER PUBLICATIONS

Ahmed et al., Discrete Cosine Transform, Jan. 1974, IEEE (Year: 1974).*
(Continued)

*Primary Examiner* — William G Trost, IV
*Assistant Examiner* — Abdelbasst Talioua
(74) *Attorney, Agent, or Firm* — HALEY GUILIANO LLP

(57) ABSTRACT

Systems and methods for improved monitoring of content distribution are described herein. In some embodiments, control circuitry may transmit a video stream to a node, and compare a fingerprint of a first video frame transmitted from the node to reference fingerprints in database in order to determine a time offset between a transmission time of content to the node, and a transmission time of the content from the node. The control circuitry may then monitor a transmission from the node by transmitting a request, to the node, to generate a second fingerprint at a predetermined transmission time, the predetermined transmission time being a second transmission time of a second video frame to the node adjusted based on the time offset. In some embodiments, the control circuitry may also generate alerts based on determining that a node failed to properly retransmit content.

20 Claims, 9 Drawing Sheets

(51) Int. Cl.
  *H04N 21/237* (2011.01)
  *H04N 21/238* (2011.01)
  *H04N 21/8547* (2011.01)
(58) Field of Classification Search
  CPC ......... H04N 21/8455; H04N 21/44008; H04N 21/4318; H04N 21/4532; H04N 21/4622; H04H 20/74
  See application file for complete search history.

(56) References Cited

U.S. PATENT DOCUMENTS

| | | | |
|---|---|---|---|
| 6,564,378 B1 | 5/2003 | Satterfield et al. | |
| 6,756,997 B1 | 6/2004 | Ward, III et al. | |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 8,060,372 B2* | 11/2011 | Topchy | H04H 60/58 725/18 |
| 8,108,887 B2* | 1/2012 | Lee | H04H 60/58 725/18 |
| 8,166,497 B2* | 4/2012 | Mears | H04H 60/31 725/9 |
| 8,600,531 B2* | 12/2013 | Topchy | G11B 27/28 381/56 |
| 8,776,116 B2* | 7/2014 | Wright | H04N 21/23 725/135 |
| 9,520,142 B2* | 12/2016 | Kalampoukas | H04W 4/021 |
| 9,786,298 B1* | 10/2017 | Greene | G06F 16/683 |
| 10,075,751 B2* | 9/2018 | Maughan | H04N 21/2407 |
| 10,390,083 B2* | 8/2019 | Chen | H04N 21/440245 |
| 10,469,309 B1* | 11/2019 | Gupta | H04L 41/0609 |
| 10,825,056 B1* | 11/2020 | Cormie | H04N 21/44008 |
| 2002/0174430 A1 | 11/2002 | Ellis et al. | |
| 2003/0110499 A1 | 6/2003 | Knudson et al. | |
| 2004/0148159 A1* | 7/2004 | Crockett | H04N 21/4341 704/211 |
| 2005/0203927 A1* | 9/2005 | Sull | G06F 16/71 |
| 2005/0251827 A1 | 11/2005 | Ellis et al. | |
| 2006/0083265 A1* | 4/2006 | Jordan | H04J 3/0682 370/410 |
| 2010/0131970 A1* | 5/2010 | Falcon | H04H 60/56 725/19 |
| 2010/0153885 A1 | 6/2010 | Yates | |
| 2013/0162902 A1* | 6/2013 | Musser, Jr. | H04N 21/44008 348/E5.009 |
| 2013/0202150 A1* | 8/2013 | Sinha | H04N 21/435 382/100 |
| 2013/0276033 A1* | 10/2013 | Francini | H04N 21/8456 725/50 |
| 2014/0201787 A1* | 7/2014 | Neumeier | H04N 21/4667 725/34 |
| 2014/0254806 A1* | 9/2014 | Fonseca, Jr. | G10L 25/51 381/56 |
| 2015/0074615 A1* | 3/2015 | Han | H04W 12/06 715/863 |
| 2015/0301718 A1* | 10/2015 | Trollope | G06F 3/04842 715/716 |
| 2015/0331660 A1* | 11/2015 | Kalampoukas | G10L 15/06 700/94 |
| 2015/0332687 A1* | 11/2015 | Kalampoukas | G10L 19/018 704/211 |
| 2016/0014305 A1* | 1/2016 | Schlattmann | G06V 20/48 348/515 |
| 2016/0073148 A1* | 3/2016 | Winograd | H04N 21/6582 725/18 |
| 2016/0196631 A1* | 7/2016 | Master | G06T 1/0085 382/100 |
| 2016/0267180 A1* | 9/2016 | Harron | G06F 16/78 |
| 2016/0316261 A1* | 10/2016 | Koshevoy | H04H 60/59 |
| 2016/0336025 A1* | 11/2016 | Kalampoukas | G10L 19/018 |
| 2017/0013324 A1* | 1/2017 | Chen | G06F 16/73 |
| 2017/0085376 A1* | 3/2017 | Will | H04L 63/1408 |
| 2017/0094349 A1 | 3/2017 | Maughan | |
| 2017/0251281 A1* | 8/2017 | Seo | H04N 21/2353 |
| 2017/0294194 A1* | 10/2017 | Greene | G10H 1/0008 |
| 2018/0149746 A1* | 5/2018 | Leskiw | G01S 15/8959 |
| 2019/0108187 A1* | 4/2019 | Coover | G06F 16/61 |
| 2019/0251602 A1* | 8/2019 | Cormie | H04N 21/23424 |

OTHER PUBLICATIONS

International Search Report and Written Opinion of PCT/US2017/036537 dated Apr. 3, 2018.
International Preliminary Report on Patentability of PCT/US2017/036537 dated Dec. 10, 2019.

\* cited by examiner

SYSTEMS AND METHODS FOR MONITORING CONTENT DISTRIBUTION

CROSS-REFERENCE TO RELATED APPLICATIONS

This application is a national stage application under 35 U.S.C. § 371 of International Application PCT/US2017/036537, filed Jun. 8, 2017, the disclosure of which is hereby incorporated by reference herein in its entirety.

BACKGROUND

Video programs and other media are traditionally provided to users through a variety of distribution points, or nodes, such as local broadcasting stations and media affiliates. This process results in a distribution delay between the content being provided to the nodes by a media provider, the content arriving at the nodes, and the content ultimately being provided to end users from the nodes. Moreover, because each of these nodes may be found at disparate locations, this distribution delay can vary substantially from node to node.

SUMMARY

Accordingly, systems and methods are disclosed herein for monitoring content distribution while accounting for distribution delay. The systems and methods may be used to verify whether or not particular content was distributed from a particular node (e.g., a distribution point, broadcast station, or media affiliate) at a given time, and thus may be used to improve the accuracy of automatic content recognition (ACR) techniques used by media providers. In turn, this may allow media providers to determine whether or not nodes have had technical difficulties that need to be addressed, or if the node operators merely chose not to distribute a given portion of content. These systems and methods may also enable media providers to determine more efficient means for providing content to nodes, to better determine the number of end users consuming the provided content, and to improve the overall operation of a media distribution network as a result.

In some aspects, control circuitry transmits a video stream to a node, the video stream comprising a plurality of video frames. In general, a media provider such as a multichannel video programming distributor (MVPD) may implement a system to transmit television channels or other video content to various nodes spread across the country. For instance, the control circuitry in such a system may transmit a video stream containing a copy of a particular sports game "Red Sox vs. Yankees" to a node operated by a local broadcasting affiliate of the "Fox" network. This video stream may be made up of individual video frames, or images, which are presented to end users on an appropriate display device at a suitable rate (e.g., 24 frames per second). This transmission may be made over a cable connection, a satellite connection, or any other type of suitable wired or wireless connection.

In some embodiments, the node is a first node, and the control circuitry transmits the video stream to the first node by identifying, from a node subscription database, one or more nodes in addition to the first node to which the video stream is to be transmitted. For example, the control circuitry may be configured to transmit a copy of the sports game "Red Sox vs. Yankees" to a number of different nodes or other distribution points located in the Northeastern United States, and transmit a different sports game to other nodes located in other portions of the United States. In this case, the control circuitry may use a node subscription database to determine the appropriate nodes that should receive the sports game "Red Sox vs. Yankees." The control circuitry may then simultaneously transmit the video stream to each of the one or more nodes and the first node over a common communication path. For example, the control circuitry may be configured to transmit the sports game "Red Sox vs. Yankees" to the appropriate nodes over a satellite connection, or appropriate cable connection.

The control circuitry may then receive a first fingerprint of a first video frame of the plurality of video frames transmitted from the node, and a first timestamp indicative of a first transmission time of the first video frame from the node. For example, a particular node may receive the video stream corresponding to the sports game "Red Sox vs. Yankees," and retransmit the video stream to any number of end users. A fingerprint may be generated from one of the video frames in the video stream transmitted by the node, and communicated to the control circuitry along with a timestamp indicating when that particular video frame was transmitted from the node. For instance, if the fingerprint was generated from the video frame being transmitted by the node at exactly "07:30:01 pm," the control circuitry may receive a copy of the fingerprint, as well as a timestamp indicating that the fingerprint corresponds to the video frame transmitted at "07:30:01 pm."

In some embodiments, the control circuitry receives the first fingerprint by receiving, from the node, at least a portion of the first video frame of the plurality of video frames transmitted from the node. For example, the control circuitry may receive a copy of the entire video frame, or a smaller portion of the video frame containing a particular type of watermark, a channel logo, or other identifying feature. The control circuitry may then sample the at least a portion of the first video frame. For example, the control circuitry may attempt to extract a watermark from the received portion of the video frame, or decompose the portion of the video frame into its spectral components by apply a suitable spectral analysis technique. The control circuitry may then determine, from the sample, unique characteristics of the first video frame. For example, the control circuitry may determine if there is a particular unique watermark, or unique set of spectral components associated with the video frame. The control circuitry may then generate, as the first fingerprint, a unique fingerprint based on the unique characteristics of the first video frame. For example, the control circuitry may generate the fingerprint using a watermark or set of spectral components that uniquely identifies the video frame.

The control circuitry may then access a database comprising a plurality of entries that each include a respective fingerprint and a respective associated timestamp indicative of a respective associated transmission time to the node of a respective associated video frame used to generate the respective fingerprint. For example, the control circuitry may access a fingerprint database maintained by the media provider. The fingerprint database may be populated by the control circuitry with entries corresponding to the different video frames that make up the transmitted video stream, each entry including a fingerprint of a given video frame, metadata about the video frame, and a timestamp indicating when that particular video frame was transmitted to the node. For instance, if the video stream corresponding to the sports game "Red Sox vs. Yankees" was transmitted to the node, the database may contain entries for each of the video frames of the sports game "Red Sox vs. Yankees" transmitted to the node within the past two minutes.

The control circuitry may then identify, from the plurality of entries, a matching entry comprising a fingerprint that matches the first fingerprint. For example, the control circuitry may search the entries in the database, and determine that the received fingerprint matches the fingerprint of a particular entry in the database corresponding to the video frame of the sports game "Red Sox vs. Yankees" transmitted to the node at exactly "07:29:41 pm."

In some embodiments, the video stream may be transmitted to the node over a first communication path, and the control circuitry identifies the matching entry by identifying, from the plurality of entries, a plurality of matching entries comprising a fingerprint that matches the first fingerprint, each of the plurality of matching entries including a respective indication of an associated communication path used to transmit the respective associated video frame used to generate the respective fingerprint. For example, the control circuitry may transmit the sports game "Red Sox vs. Yankees" to different nodes over different communications paths. For example, it may be transmitted to a first set of nodes over a cable connection at one time, and be transmitted to a second set of nodes over a satellite connection at a slightly different time. In this case, the control circuitry may store and differentiate between two sets of fingerprints in the database. The first set corresponding to the video frames transmitted via the cable connection, and the second set corresponding to the video frames transmitted via the satellite connection. In this case, the control circuitry may identify several entries in the database matching the received fingerprint. For instance, the control circuitry may identify one entry corresponding to the video frame of the sports game "Red Sox vs. Yankees" transmitted via the cable connection at "07:29:41 pm," and another entry corresponding to the video frame of the sports game "Red Sox vs. Yankees" transmitted via the satellite connection at "07:29:51 pm." The control circuitry may then identify, as the matching entry, an entry from the plurality of matching entries with an indication of an associated communication path that matches the first communication path used to transmit the video stream to the node. For example, if the video stream was transmitted to the node via a cable connection, the control circuitry may identify the matching entry as the entry corresponding to the video frame of the sports game "Red Sox vs. Yankees" transmitted via the cable connection at "07:29:41 pm."

The control circuitry may then retrieve from the matching entry a second timestamp indicative of a second transmission time to the node of the first video frame. For example, if the matching entry corresponds to the video frame of the sports game "Red Sox vs. Yankees" transmitted to the node at "07:29:41 pm," the control circuitry may retrieve a timestamp indicating that the video frame was transmitted to the node at "07:29:41 pm."

The control circuitry may then determine, based on the first timestamp and the second timestamp, a time offset between the first transmission time and the second transmission time. For example, if the control circuitry originally received a timestamp indicating that the video frame was transmitted by the node at "07:30:01 pm," and used the fingerprint to determine that the video frame was originally transmitted to the node at "07:29:41 pm," the control circuitry may determine a time offset of twenty seconds.

In some embodiments, the time offset is a first time offset, and the control circuitry may determine a plurality of respective time offsets for each respective node of one or more nodes, each of the plurality of time offsets representing a difference between a respective first transmission time of a respective video frame from a respective node, and a respective second transmission time of the respective video frame to the respective node. For example, the control circuitry may be configured to transmit the video stream to multiple nodes, and the control circuitry may determine a time offset for each of the nodes that the video stream is transmitted to. For instance, the control circuitry may determine that there is a time offset of twenty seconds between a given video frame being transmitted to a first node, and the video frame being retransmitted from the first node. By comparison, the control circuitry may determine that there is a time offset of ten seconds between a given video frame being transmitted to another node, and the video frame being retransmitted from the other node. The control circuitry may then store each of the plurality of respective time offsets with the first time offset in a time offset database. For instance, the control circuitry may maintain a database of time offsets that is accessible to a media provider, and may use the time offset of a particular node when providing instructions or interpreting communications from that particular node.

The control circuitry may then transmit a request, to the node, to generate a second fingerprint of a second video frame transmitted by the node at a predetermined transmission time, the predetermined transmission time being a second transmission time of the second video frame to the node adjusted based on the time offset. For instance, the control circuitry may be configured to determine whether or not the node broadcasts the portion of the sports game "Red Sox vs. Yankees" transmitted to the node by the media provider at "8:00:00 pm." In this case, knowing that there is a time offset of twenty seconds for the node, the control circuitry may transmit a request to generate a fingerprint of the video frame transmitted by the node at "8:00:20 pm," which is the transmission time of the second video frame to the node, "8:00:00 pm," adjusted based on the twenty-second time offset. In general, it is understood that the timestamps and the time offsets may have any suitable level of precision. For example, each of the timestamps and time offsets may be measured to the nearest second, millisecond, or microsecond. It is also understood that, in some embodiments, the precision of the timestamps and time offsets may be varied dynamically or deterministically (e.g., in response to user inputs, or in response to changes in the relative size of the time offsets measured at different points in time). For example, if the control circuitry previously used timestamps measured to the nearest second to determine that the time offset for a given node was on the order of one to two seconds, the control circuitry may be configured to automatically use more precise timestamps in the future, in order to determine a more precise time offset measured to the nearest millisecond or microsecond instead. As an alternate example, the control circuitry may be configured to vary the precision of the timestamps and the corresponding time offsets to ensure that that future time offsets are measured with a predetermined number of significant figures (e.g., four significant figures). For instance, if the control circuitry previously determined that a time offset for a given node is on the order of 3 seconds, the control circuitry may be configured to use more precise timestamps in the future in order to determine that the time offset for the given node is actually 3.162 seconds.

In some embodiments, the video stream is transmitted from the node to an end user through an intermediary node. For example, after the video stream is received by the node, the node may retransmit the video stream to an intermediary node connected to the end user. In turn, the intermediary node may be responsible for transmitting the video stream to the end user. A third timestamp is then determined indicative of a third transmission time of the first video frame from the intermediary node toward the end user. For example, it may be determined that the intermediary node transmitted the first video frame toward the end user at precisely "07:30:03 pm." This determination may be made by control circuitry operating at a main facility, control circuitry operating within a node, or through any other suitable means. For instance, control circuitry within a main facility may use fingerprints generated from the video stream transmitted by the intermediary node in order to determine that the intermediary node transmitted the video frame to the end user at precisely "7:30:03 pm." Based on the first timestamp and the third timestamp, a relative time offset is then determined between the first transmission time of the first video frame from the node and the third transmission time of the first video frame from the intermediary node toward the end user. For example, if it was previously determined that the first video frame was transmitted by the node to the intermediary node at precisely "07:30:01 pm," and the first video frame was transmitted by the intermediary node to the end user at precisely "7:30:03 pm," the control circuitry may determine that there is a relative time offset of two seconds between the two transmissions. In general, a relative time offset may be determined between the receipt or transmission times of a particular video frame between any of the various content sources, nodes, or end-users within a distribution network, and this determination may be made by made using control circuitry distributed throughout any of the content sources, nodes, or end-users within the distribution network. In some embodiments, the control circuitry may also use a time offset to estimate the number of nodes involved in delivering the video stream to the end user. For example, the control circuitry may have previously determined that each node in the network requires approximately 3-seconds to receive and retransmit a given video stream. If there is a relative time offset of approximately 9-seconds between the video stream being transmitted by the main facility, and the video stream being received by the end user, the control circuitry may determine that there are approximately three nodes involved in delivering the video stream to the end user (e.g., a first node that receives the video stream from the main facility, and two intermediary nodes in-between the first node and the end user). It is understood that the control circuitry may use any suitable method to determine the typical amount of time required for a node to receive and retransmit a given video stream. For example, the control circuitry may use historical time offset data that was previously determined for a given set of nodes in order to approximate an expected time offset for similar nodes in the future. In some embodiments, this historical time offset data may also be used to determine the level of precision used to measure timestamps and time offsets in the future. For example, if the time offset for a given node is typically on the order of a few milliseconds, the control circuitry may be configured to retrieve timestamps from that node which are accurate to the nearest 0.001 milliseconds, which may enable the control circuitry to determine a relative time offset that will be accurate up to four significant digits.

In some embodiments, the node is a first node, and the video stream is simultaneously transmitted to the first node and a second node from a common source, wherein the first node transmits the video stream toward a first end user, and the second node transmits the video stream toward a second end user. For example, the video stream may be transmitted from a main facility to the first node over a terrestrial communication path, and simultaneously transmitted from the main facility to a second node over a satellite communication path. In turn, the first node may retransmit the video stream toward an end user on the East coast, and the second node may retransmit the video stream toward a different user on the West coast. A third timestamp is then determined indicative of a third transmission time of the first video frame from the second node. This determination may be made by control circuitry operating at a main facility, control circuitry operating within a node, or through any other suitable means. For example, control circuitry residing within the second node may use fingerprints generated from the video stream transmitted by the second node in order to determine that the second node transmitted the video frame to an end user at precisely "7:30:05 pm." Based on the first timestamp and the third timestamp, a relative time offset is then determined between the first transmission time of the first video frame from the first node and the third transmission time of the first video frame from the second node. For example, if it were previously determined that the first video frame was transmitted by the first node at precisely "07:30:01 pm," and the first video frame was transmitted by the second node at precisely "7:30:05 pm," control circuitry within the second node may determine that there is a relative time offset of four seconds between the two transmissions. In general, a relative time offset may be determined between the receipt or transmission times of a particular video frame at any of various content sources, nodes, or end users within a distribution network, and this determination may be made using control circuitry distributed throughout any of the content sources, nodes, or end users within the distribution network. For example, the first node may directly receive fingerprints generated from video frames transmitted by the second node, and control circuitry within the first node may be used to determine the relative time offset between the first node and the second node. As another example, control circuitry within the first and second nodes may be configured to use fingerprints to determine the transmission time of a given video frame from the first and second nodes, and control circuitry within a main facility may be configured to retrieve this information from the first and second nodes, and determine the relative time offsets between the first and second nodes.

In some embodiments, based on transmitting the request to the node, the control circuitry may receive the second fingerprint of the second video frame transmitted by the node at the predetermined transmission time. For example, if the control circuitry transmitted a request to generate a fingerprint of the video frame transmitted by the node at "8:00:20 pm," the control circuitry may receive the actual fingerprint of the video frame transmitted by the node at "8:00:20 pm." In response to receiving the second fingerprint of the second video frame transmitted by the node at the predetermined transmission time, the control circuitry may determine whether the second fingerprint matches a third fingerprint generated from a third video frame transmitted to the node at the second transmission time. For example, the received fingerprint may be compared to a fingerprint generated from the actual video frame transmitted to the node at "8:00:00 pm." In response to determining that the second fingerprint matches the first fingerprint, the control circuitry may generate a first alert indicating that the node has successfully retransmitted the video stream. For instance, the control circuitry may generate an alert indicating that the node properly rebroadcast the portion of the sports game "Red Sox vs. Yankees" transmitted to the node by the media provider at "8:00:00 pm." Alternately, in response to determining that the second fingerprint does not match the first fingerprint, the control circuitry may generate a second alert indicating that the node failed to retransmit the video stream. For instance, the control circuitry may generate an alert indicating that the node did not properly rebroadcast the portion of the sports game "Red Sox vs. Yankees" transmitted to the node by the media provider at "8:00:00 pm."

In some embodiments, the video stream is transmitted over a first communication path, and as part of generating the second alert, the control circuitry may transmit a request to the node to confirm receipt of the video stream. For instance, the control circuitry may generate an alert indicating that the node failed to rebroadcast part of the sports game "Red Sox vs. Yankees" transmitted to the node over a particular cable link. When generating the alert, the control circuitry may send a request to the node to confirm whether or not the node properly received the transmitted copy of the sports game "Red Sox vs. Yankees" over the appropriate cable link. Based on transmitting the request to confirm receipt of the video stream, the control circuitry may receive a confirmation from the node. For example, the control circuitry may receive a confirmation from the node over the cable link, or over another suitable communication path, such as a TCP/IP network connection. The control circuitry may then determine whether the confirmation indicates that the node received the video stream. For instance, the control circuitry may receive a confirmation from the node indicating whether or not the node actually received the transmitted copy of the sports game "Red Sox vs. Yankees" over the appropriate cable link. In response to determining that the confirmation indicates that the node received the video stream, the control circuitry may continue to transmit the video stream over the first communication path. For example, if the control circuitry determines that the node received the transmitted copy of the sports game "Red Sox vs. Yankees," but simply chose not to rebroadcast it, the control circuitry may continue to transmit the copy of the sports game "Red Sox vs. Yankees" to the node over the same cable link, and may use a fingerprint of the video stream being transmitted by the node (i.e., a fingerprint of the different content being transmitted instead of the sports game "Red Sox vs. Yankees") in order to determine what content is actually being transmitted by the node. The control circuitry may also be configured to record a log of the different content actually being transmitted by the node (e.g., in a local database within a main facility housing the control circuitry). Alternately, in response to determining that the confirmation indicates that the node did not receive the video stream, the control circuitry may transmit the video stream to the node over a second communication path different from the first communication path. For example, if the control circuitry determines that the node never received the transmitted copy of the sports game "Red Sox vs. Yankees" over the cable link, the control circuitry may be configured to transmit the sports game "Red Sox vs. Yankees" to the node over a satellite connection instead.

In some embodiments, the video stream is a first video stream, and as part of generating the first alert, the control circuitry may transmit to the node, for a predefined period of time, a second video stream different from the first video stream, the second video stream comprising supplemental content. For example, the control circuitry may generate an alert indicating that the node properly rebroadcast the portion of the sports game "Red Sox vs. Yankees," transmitted to the node by the media provider at "8:00:00 pm." As part of generating this alert, the control circuitry may begin transmitting another video stream to the node in place of the sports game "Red Sox vs. Yankees" for a predefined period of time. For instance, the other video stream may include alerts, advertisements, or promotional materials of a fixed length to be rebroadcast by individual nodes. The control circuitry may then transmit to the node, after the predefined period of time, the first video stream. For example, after the alert or promotional material has been transmitted in its entirety, the control circuitry may resume transmission of the sports game "Red Sox vs. Yankees."

In some embodiments, the control circuitry may generate the second alert by identifying, from the plurality of entries, a second matching entry comprising a fingerprint that matches the second fingerprint, the second matching entry comprising an identity of an associated media asset containing the respective associated video frame used to generate the respective fingerprint of the second matching entry. For example, the control circuitry may determine that the second fingerprint matches an entry for a separate televised sports game, "Celtics vs. Bulls." The control circuitry may then retrieve, from the matching entry, the identity of the associated media asset. For instance, the control circuitry may retrieve the identity of the associated media asset, the televised sports game "Celtics vs. Bulls." The control circuitry may then store the second alert in an alert record database, the second alert comprising data indicative of the identity of the associated media asset. For example, the control circuitry may store the alert in the alert record database indicating that the node transmitted a copy of the televised sports game "Celtics vs. Bulls" instead of the televised sports game "Red Sox vs. Yankees."

In some embodiments, the node is a first node, the predetermined time is a first predetermined time, the time offset is a first time offset, and the control circuitry may transmit the video stream to a second node simultaneously with the transmission to the first node. For example, in addition to transmitting a copy of the sports game "Red Sox vs. Yankees" to the first node, the control circuitry may be configured to transmit a copy of the sports game "Red Sox vs. Yankees" to another node in the Northeastern United States. The control circuitry may then transmit a request to the second node to generate a fourth fingerprint of a fourth video frame transmitted by the second node at a second predetermined transmission time, the second predetermined transmission time being the second transmission time adjusted based on a second time offset. For example, if the control circuitry determines that the other node has a time offset of ten seconds, the control circuitry may transmit a request to the other node to generate a fingerprint of the video frame transmitted by the second node at "8:00:10 pm," which is the transmission time of the second video frame to the nodes, "8:00:00 pm," adjusted based on the ten-second time offset. In response to transmitting the request to the second node, the control circuitry may receive the fourth fingerprint of the fourth video frame transmitted by the second node at the second predetermined transmission time. For example, the control circuitry may receive the fingerprint of the video frame transmitted by the second node at "8:00:10 pm." The control circuitry may then determine whether the second fingerprint of the second video frame transmitted by the first node matches the fourth fingerprint of the fourth video frame transmitted by the second node. For example, the control circuitry may determine whether the fingerprint of the video frame transmitted by the first node at "8:00:20 pm" matches the fingerprint of the video frame transmitted by the second node at "8:00:10 pm." In response to determining that the second fingerprint matches the fourth fingerprint, the control circuitry may generate a third alert indicating that the first node and the second node made matching transmissions. For example, the control circuitry may generate an alert indicating that both of the nodes are broadcasting the sports game "Red Sox vs. Yankees." Alternately, in response to determining that the second fingerprint does not match the fourth fingerprint, the control circuitry may generate a fourth alert indicating that the first node and the second node did not make matching transmissions. For example, the control circuitry may generate an alert indicating that the nodes are not tracking one another, and at least one of the stations is not broadcasting the sports game "Red Sox vs. Yankees."

In some embodiments, the control circuitry may receive fingerprints from the first node and the second node on an ongoing basis, and may select the fingerprints to compare based on a relative time offset of the first node and the second node. For example, the control circuitry may be configured to receive fingerprints from the first node and the second note at regular intervals (e.g., once per second). The control circuitry may then determine a relative time offset between the nodes, and select the fingerprints to compare accordingly. For example, the control circuitry may determined that there is a 10-second time offset for the first node, and a 15-second time offset for the second node, implying a 5-second relative time offset between the two nodes. In this case, if the control circuitry received a fingerprint from the first node with a given timestamp, the control circuitry will compare that to a fingerprint received from the second node with a timestamp five seconds later than the given timestamp. For instance, if the fingerprint from the first node corresponded to a video frame transmitted by the first node at "9:00:01 pm," the selected fingerprint from the second node may correspond to a video frame transmitted by the second node at "9:00:06 pm." The control circuitry may then generate an appropriate alert based on whether or not the fingerprints match. For example, the control circuitry may generate an alert indicating that the first node and the second node made matching transmissions in response to determining that the selected fingerprints match. In general, it is understood that similar methods may be employed by control circuitry at a main facility, or by control circuitry located within each of the individual nodes or other entities within the distribution network. For example, control circuitry within a first node may determine a relative time offset with a second node in the distribution network, and determine whether or not the second node is transmitting the same content as the first node by comparing fingerprints of content transmitted by the first node at a given time with fingerprints of content transmitted by the second node at a different time determined based on the given time and the relative time offset.

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
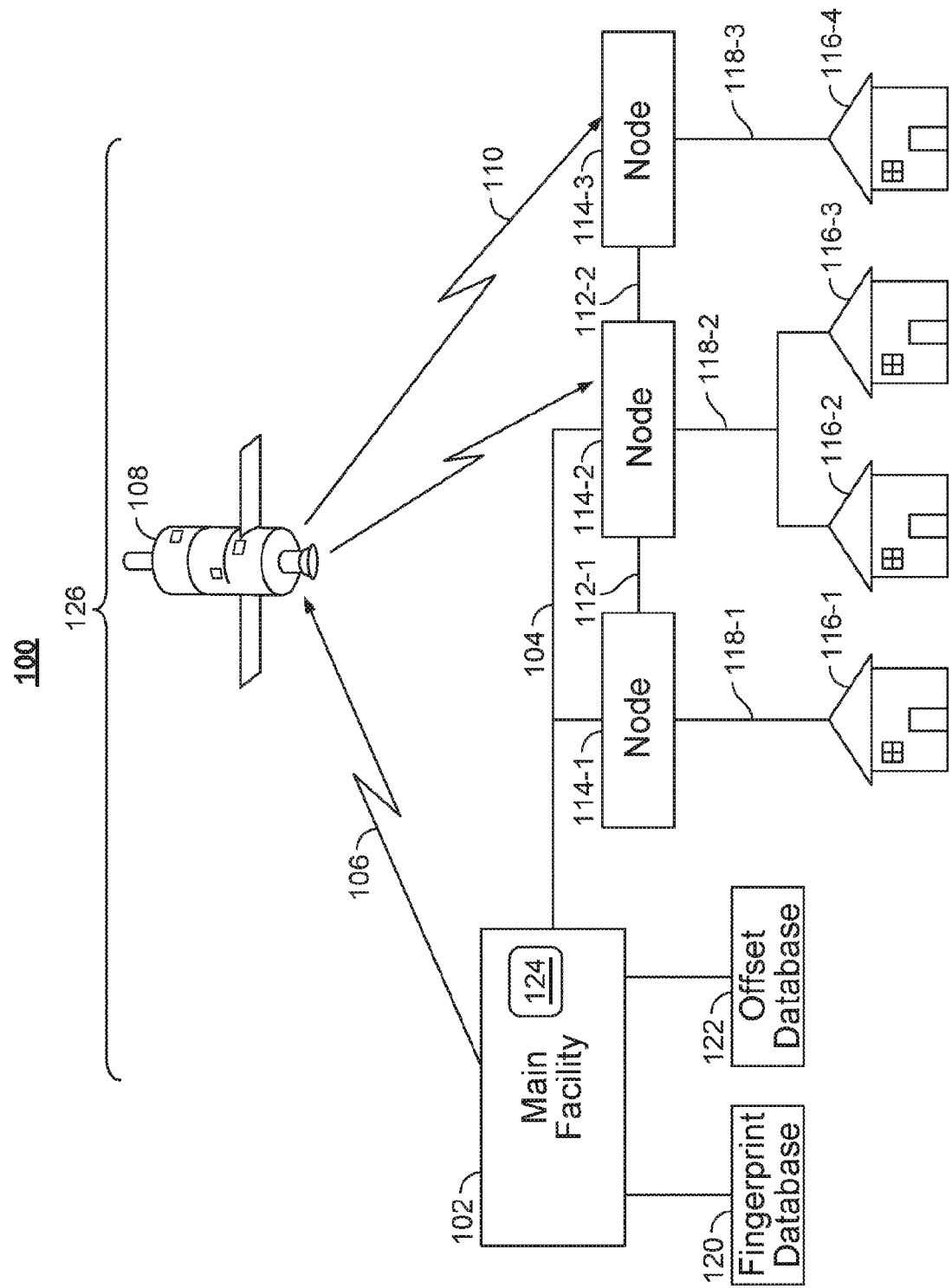
FIG. 1 shows an illustrative example of a system for monitoring content distribution, in accordance with some embodiments of the disclosure.

Systems and methods are presented for improved monitoring of content distribution. The systems and methods may be used to verify whether or not particular content was distributed from a particular node (e.g., a distribution point, broadcast station, or media affiliate) at a given time, and improve the accuracy of automatic content recognition (ACR) techniques used by media providers. In turn, this may allow media providers to determine whether or not distribution points have had technical difficulties that need to be addressed, or merely chose not to distribute a given portion of content. These systems and methods may also enable media providers to determine the most efficient means for providing content to distribution points, better determine the number of end users consuming the provided content, and improve the overall operation of a media distribution network as a result.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 4:
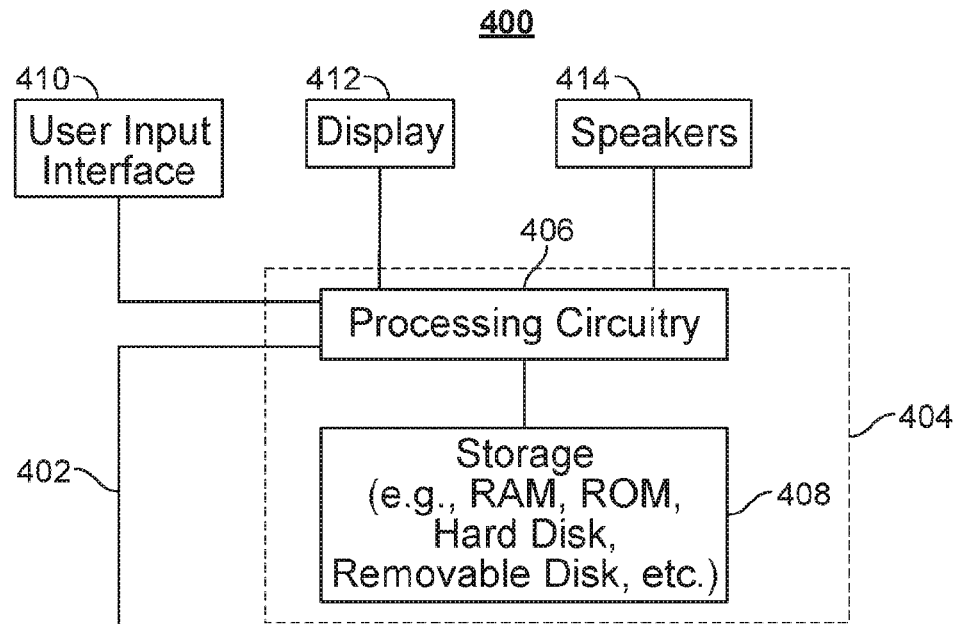
FIG. 4 is a block diagram of an illustrative user equipment device in accordance with some embodiments of the disclosure.
Figure 5:
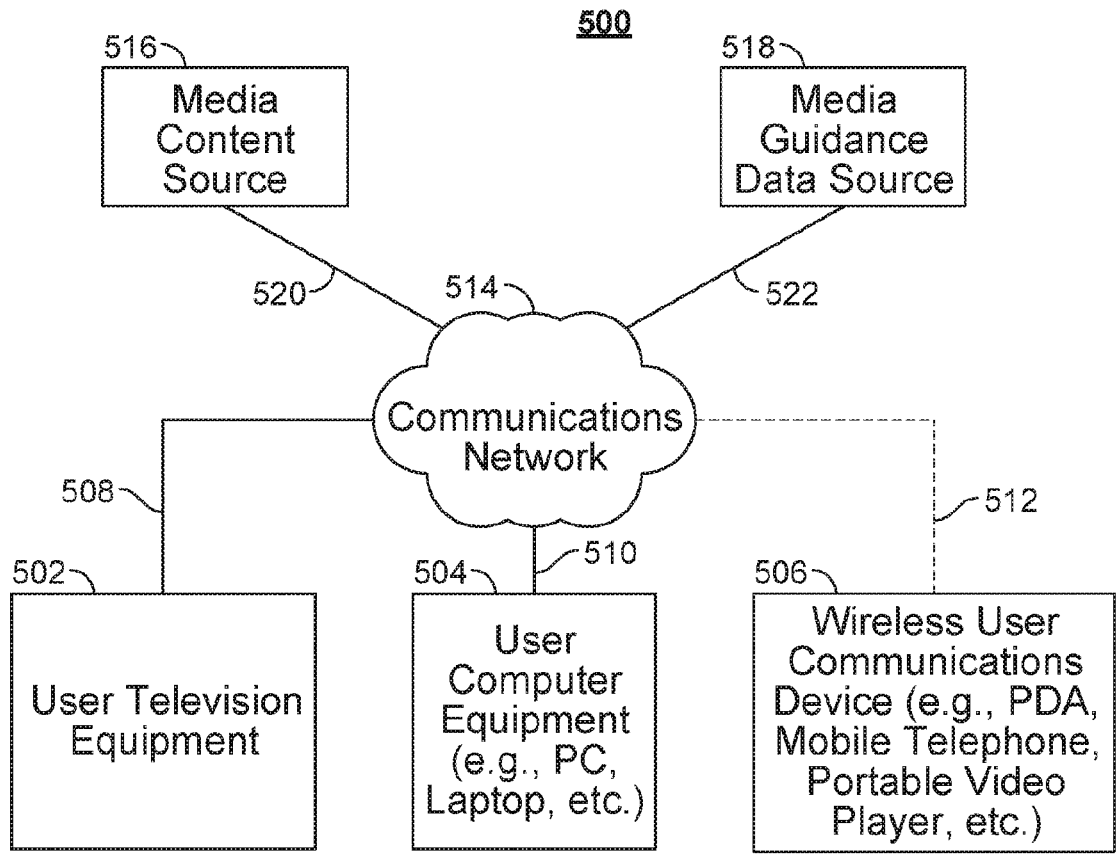
FIG. 5 is a block diagram of an illustrative media system in accordance with some embodiments of the disclosure.

FIG. 1 shows an illustrative example of a system for monitoring content distribution, in accordance with some embodiments of the disclosure. Content transmitted throughout distribution system 100 may be provided by main facility 102. In general, main facility 102 may be a television distribution facility, cable system headend, or satellite distribution facility operated by a content provider. In general, main facility 102 may transmit content to distribution points, such as nodes 114-1, 114-2, or 114-3 (collectively, nodes 114) over a suitable communication path, such as terrestrial communication path 104, or satellite uplink 106 and satellite downlink 110 from satellite 108 (collectively, satellite communication path 126). Additionally, nodes 114 may be connected by communication paths 112-1 and 112-2, and control circuitry 124 may route communications from main facility 102 to nodes 114 through communication paths 112-1 and 112-2 (collectively, communication path 112). For instance, control circuitry 124 may transmit a video steam to node 114-3 by first transmitting it through communication path 104 to node 114-2, and from there to node 114-3 through communication path 112-2. In turn, nodes 114 may be nodes designed to retransmit content to end users 116-1, 116-2, 116-3, and 116-4 (collectively, end users 116) over communication paths 118-1, 118-2, and 118-3 (collectively, communication paths 118). In general, operation of the main facility 102 may be governed by control circuitry 124 operating within the main facility 102, and control circuitry 124 may be responsible for both distributing content to nodes 114, and monitoring the content distributed to the end users 116 from nodes 114. In some embodiments, control circuitry 124 may alternately be distributed across the various hardware or systems depicted in FIG. 1, or otherwise used in connection with the processes described in relation to FIG. 1. In general, control circuitry 124 may also be distributed across the various hardware and systems discussed in relation to FIG. 4 and FIG. 5, such as control circuitry 404 (FIG. 4), media content source 516 (FIG. 5), or media guidance data source 518 (FIG. 5). Control circuitry 124 may also include any of the hardware and perform any of the functions discussed in relation to control circuitry 404 (FIG. 4). For example, control circuitry 124 may include processing circuitry and communication circuitry, and may be used to send and receive commands, requests, and other suitable data through a suitable input/output path. In some embodiments, control circuitry 124 may be equivalent to control circuitry 404 (FIG. 4). In some embodiments, control circuitry 124 may implement, or be involved in implementing, a media guidance application. For example, control circuitry 124 may implement a media guidance application to provide media guidance data to end users 116. In some embodiments, control circuitry 124 may operate responsive to instructions received from a media guidance application, such as the media guidance application discussed in relation to FIGS. 2-5.

For illustrative purposes, FIG. 1 depicts nodes 114 connected directly to end users 116. However, it is understood that there may be any number of intermediary nodes in-between nodes 114 and end users 116 (e.g., intermediary nodes that receive and retransmit video or data, and form a portion of communication paths 118). For example, node 114-1 may transmit video to an intermediary node that forms part of communication path 118-1, and the intermediary node may be configured to retransmit the video to end user 116-1. As another example, node 114-1 may be configured to transmit a video stream to end user 116-4 by transmitting the video stream to node 114-2, which, in turn, transmits the video stream to node 114-3, which, in turn, transmits the video stream to end user 116-4. In this case, both node 114-2 and node 113-3 may be considered intermediary nodes between node 114-1 and end user 116-4.

For illustrative purposes, control circuitry 124 may be discussed as receiving fingerprints and determining time offsets relative to video signals transmitted from a single main facility (e.g., main facility 102). However, it is understood that control circuitry 124 may be located, either whole or in part, within each of the entities within the distribution network 100 (e.g., the various nodes 114, or end users 116), and any of the entities within the distribution network 100 may be configured with control circuitry (e.g., control circuitry similar to control circuitry 124) to exchange fingerprints and determine relative time offsets between other entities of the distribution network 100. Moreover, control circuitry 124 may be configured to determine relative time offsets between any of the various entities in the distribution network 100. For example, control circuitry 124 may compare fingerprints generated from a transmission received at node 114-1, the transmission subsequently made by node 114-1, and the transmission received by end user 116-1, and use this information in order to determine the time offset between the video signal being transmitted from main facility 102 over communication path 104, and the video signal being received by node 114-1. Control circuitry 124 may also use this information to determine a time offset between receipt of the video stream at node 114-1 and retransmission of the video stream from node 114-1, and the time offset between the video signal being transmitted from node 114-1 over communication path 118-1 and the video signal being received by end user 116-1. For instance, control circuitry 124 may determine that there was a 1-second offset between a video stream being transmitted from main facility 102 and the video stream being received at node 114-1, an additional 3-second offset before the video stream is rebroadcasted by node 114-1, and a 2-second offset between the video stream being transmitted by node 114-1 over communication path 118-1 and the video stream being received by end user 116-1. By monitoring the relative offsets between each of the various entities within distribution network 100, this may enable control circuitry 124 to better identify and address aberrant behavior within distribution network 100.

In order to monitor transmissions from nodes 114, control circuitry 124 may be configured to perform automatic content recognition (ACR) on the video streams transmitted from nodes 114. For instance, control circuitry 124 may be configured to receive fingerprint data, logo data, SAP print data, or other identifying data from the video streams transmitted from nodes 114. This information may then be compared by control circuitry 124 to known reference information stored in a database (e.g., fingerprints stored in fingerprint database 120) in order to determine the precise identity of the video frame associated with identifying data. For illustrative purposes, control circuitry 124 may be described as receiving fingerprints generated from frames of video streams transmitted by nodes 114. However, it is understood that control circuitry 124 may receive any type of suitable identifying information. Similarly, for illustrative purposes, control circuitry 124 may be described as receiving fingerprints of video frames from nodes 114. However, it is understood that control circuitry 124 may receive these fingerprints, or other identifying information, from listening stations or other receivers configured to monitor transmissions to and from nodes 114.

In some embodiments, individual nodes (e.g., nodes 114) may be configured to exchange fingerprints with one another, and may use these fingerprints to determine relative offsets between the nodes. For example, node 114-1 may be configured to directly exchange fingerprints with nodes 114-2 and 114-3 (e.g., via communication paths 112-1 and 112-2). Based on this comparison, node 114-1 may directly determine an offset relative to node 114-2, or may determine whether or not node 114-1 and node 114-2 are receiving and transmitting similar content. For example, node 114-1 may determine that it received a particular video stream transmitted over communication path 104 exactly one second later than node 114-2, or may determine that the content being received over communication path 104 differs from the content being transmitted to node 114-3 over satellite communication path 126. More generally, any of the entities within distribution network 100 (e.g., main facility 124, nodes 114, or end users 116) may exchange fingerprints among one another, and be configured to determine relative offsets between one another. For example, end user 116-1 may exchange fingerprints with any of the other entities within distribution network 100, and maintain a local offset database (e.g., similar to offset database 122) storing relative time offsets between a video transmission received by end user 116-1, and the same video transmission received by any of the other entities within distribution network 100.

In some embodiments, control circuitry may be configured to categorize each of nodes 114 into a distribution profile group (DPG) for monitoring purposes. In general, a distribution profile group may comprise a list of nodes 114 that are intended to receive a certain video stream, or receive multimedia content over a certain set of communication paths. For example, node 114-1 and 114-2 may be included in a distribution profile group because they may both receive a common video stream transmitted from main facility 102 over communication path 104. In general, control circuitry 124 may monitor transmissions from nodes 114 to determine if any of nodes 114 in a given distribution profile group display aberrant behavior, for example, by failing to retransmit content provided over communication path 104 to end users 116.

In some embodiments, the nodes 114 within a distribution profile group may monitor one another directly. For example, node 114-1 may receive fingerprints generated from video transmissions received by nodes 114-2 and 114-3. By comparing these to fingerprints generated based on video transmissions received at node 114-1, node 114-1 may determine whether or not nodes 114-2 and 114-3 received the same content as node 114-1, and whether the nodes 114 received the content at different times. Similarly, node 114-1 may receive fingerprints generated from videos transmitted by nodes 114-2 and 114-3 to end users 116, and may determine whether or not nodes 114-2 and 114-3 transmitted the same content as node 114-1, or whether the same content was transmitted at different times (e.g., a relative time offset between the content transmitted to end users 116 from node 114-1 and nodes 114-2 or 114-2).

In some embodiments, control circuitry 124 may be configured to store different fingerprints in fingerprint database 120 for each of the distribution profile groups, which may enable control circuitry 124 to perform more accurate ACR techniques. For instance, if control circuitry 124 determines that a given fingerprint was generated based on a video stream transmitted from one of nodes 114 receiving transmissions over communication path 104, control circuitry 124 may compare that fingerprint to reference fingerprints in fingerprint database 120 generated based on video frames from the video stream transmitted to nodes 114 over that same communication path 104. In some embodiments, control circuitry 124 may store these distribution profile groups in a node subscription database (e.g., within main facility 102). This may enable control circuitry 124 to retrieve a list of nodes from the database that are supposed to receive a given transmission of a video stream. For instance, control circuitry 124 may search the database for the nodes in a particular distribution profile group that are to receive a transmission of a particular video stream. In general, it is understood that fingerprint database 120 or offset database 122 may be stored within main facility 102, or remote to main facility 102. Fingerprint database 120 may also be incorporated into any suitable media content source (e.g., media content source 516 (FIG. 5)), media guidance data source (e.g., media guidance data source 518 (FIG. 5)), or suitable user equipment (e.g., within storage 408 (FIG. 4) of user equipment device 400 (FIG. 4) operated by one of end users 116).

Generally, control circuitry 124 may be configured to transmit a video stream to nodes 114 over a communication path (e.g., communication paths 104, 112, and 126). For example, the control circuitry 124 may transmit a video stream containing a copy of a particular sports game "Red Sox vs. Yankees," to nodes 114. As the video stream is being transmitted to nodes 114, or before the video stream is being broadcast, control circuitry 124 may generate fingerprints from the individual video frames of the video stream, and store these fingerprints in fingerprint database 120.

In general, the fingerprints in fingerprint database 120 may be stored along with a timestamp indicating when the video frame used to generate the fingerprint was transmitted to nodes 114. Other metadata, such as the particular communication path used to transmit the video stream, or information about the programming contained in the video stream, may be included as well. For example, a typical entry in the fingerprint database 120 may include some or all of the following information:

Feature (Fingerprint) Data: fingerprint.dat

Associated Broadcast: "Red Sox vs. Yankees"

Frame Number Within Broadcast: 12345

Transmission Time to Node: "07:29:41:10 pm GMT"

Transmission Path: "Satellite 1"

Feature (Fingerprint) Sequence Number: 12345

Feature (Fingerprint) Generation Time: "07:29:41:01 pm GMT"

Node Time zone: "EST"

Node ID: 1141

Feature Number: 0001

This example entry includes "Feature (Fingerprint) Data," which may correspond to a data file for the actual fingerprint, or other feature, generated from a given frame of the video stream. For illustrative purposes, control circuitry 124 may be described as receiving and comparing fingerprints generated based on video signals in order to determine time offsets. However, it is understood that these fingerprints may actually be any suitable type of identifying feature, such as a watermark, logo, ghost, bug, sequence of frames, image artifact, or the like. Similarly, it is understood that these techniques may be applied to any suitable type of media, such as audio signals, and is not limited to video alone. The "Associated Broadcast" is listed as "Red Sox vs. Yankees," in the example above, and indicates which video stream the fingerprint is associated with. This information may be used by the control circuitry 124 to either limit searches in the fingerprint database 120 to only particular video streams, or it may be used by the control circuitry 124 to identify a video stream that produced a given fingerprint. The "Frame Number Within Broadcast" may indicate which frame of the broadcast was used to generate the fingerprint. For instance, in the example entry above, the fingerprint was generated from the $12345^{th}$ frame occurring within the video stream "Red Sox vs. Yankees." The "Transmission Time to Node" includes a timestamp indicative of when the video frame associated with entry was transmitted to nodes 114, and may be used by control circuitry 124 to calculate time offsets that may be stored in offset database 122. For instance, in the example above the entry indicates that the fingerprint corresponds to the video frame transmitted by control circuitry 124 to nodes 114 at precisely "07:29:41:10 pm GMT." The "Transmission Path" portion of the entry in the fingerprint database 120 may indicate which of the communication paths (e.g., which of communication paths 104 or 126) was used to transmit the video frame to nodes 114. For instance, in the example above, it is indicated that the fingerprint was generated from the video stream transmitted along the "Satellite 1" communication path. In some embodiments, it is possible that a similar video stream is transmitted to different nodes 114 over multiple communication paths, and the control circuitry 124 may use the "Transmission Path" portions of the entries in the fingerprint database 120 to accurately determine the appropriate transmission time of a video frame to a given one of nodes 114. The "Feature (Fingerprint) Sequence Number" and "Feature (Fingerprint) Generation Time" may be optionally included when the identified feature is part of a series. For example, control circuitry may be configured to generate fingerprints in quick succession of each of the video frames transmitted between "07:29:30:00 pm GMT" and "07:30:00:00 pm GMT." In the example above, the "Feature (Fingerprint) Sequence Number" and "Feature (Fingerprint) Generation Time" indicate that the entry in the fingerprint database corresponds to the 12345th fingerprint in the sequence, which was generated at precisely "07:29:41:01 pm GMT." The "Node Time zone" and "Node ID" fields identify the time zone of the node (e.g., one of the nodes 114) that is intended to receive the transmitted video stream, and the identity of the of the node that is intended to receive the transmitted video stream. In the example above, the receiving node is in the eastern time zone, "EST," and has been assigned a node identifier of "1141." Finally, the "Feature Number" may be used to identify the type of data contained in the "Feature Data," or otherwise identify the type of feature being used. For example, the "Feature Number" may correspond to a particular type of watermark or other feature which was used to create the fingerprint.dat. In general, this information may be used by the various entities within the distribution network in order to ensure that the same features are consistently being used to compare against one another. It is understood that the example above is merely illustrative, and entries in fingerprint database 120 may contain any suitable mixture of fingerprint data, and appropriate metadata.

In general, it is understood that control circuitry 124 may simultaneously transmit the video stream to any number of nodes (e.g., any of nodes 114-1, 114-2, or 114-3). In some embodiments, the control circuitry 124 may retrieve a list of nodes 114 from a node subscription database to which the video stream is to be transmitted. For example, the control circuitry 124 may access a node subscription database, and retrieve a listing of the appropriate nodes 114 who are to receive the video stream of the sports game "Red Sox vs. Yankees." The control circuitry 124 may then transmit the sports game "Red Sox vs. Yankees" to the appropriate nodes over a suitable communication path (e.g., communication path 104, 126, or 112) or combination of communication paths. In some embodiments, the control circuitry 124 may be configured to transmit the video stream to the multiple nodes 114 over a common communication path. For example, the control circuitry 124 may be configured to transmit the video stream to node 114-1 and 114-2 using communication path 104. In some embodiments, the control circuitry 124 may be configured to transmit the video stream to the multiple nodes over separate communication paths. For example, control circuitry 124 may be configured to transmit the video stream to node 114-1 over communication path 104, and transmit a separate copy of the video stream to node 114-3 over the satellite communication path 126.

To monitor content being distributed by nodes 114, control circuitry 124 within main facility 102 may be configured to receive fingerprints generated from the video streams transmitted by each of nodes 114. For example, control circuitry 124 may be configured to transmit requests to each of nodes 114 to generate a fingerprint at a predetermined time. In general, the control circuitry 124 may adjust these requests based on different amounts of time offset calculated for each of nodes 114, in order to account for the different amounts of distribution delay between a video stream being transmitted from main facility 102 to nodes 114, and the video stream being retransmitted from nodes 114 to end users 116. These offsets may be stored in offset database 122 accessible to control circuitry 124, and may be utilized whenever the control circuitry 124 transmits requests to nodes 114 to generate fingerprints of video streams of the broadcasts being made to the end users 116. For example, control circuitry 124 may be configured to transmit a video stream of the sports game "Red Sox vs. Yankees" to node 114-1, and may be configured to determine whether or not the portion of the video stream being transmitted to node 114-1 at "8:00:00 pm" is being retransmitted by node 114-1 to the end users 116. In this case, the control circuitry 124 may determine that there is a twenty-second time offset between a video stream being transmitted from main facility 102 to node 114-1, and the video stream being retransmitted from nodes 114-1 to end users 116. The control circuitry 124 may then compensate for the time offset by transmitting a request for the node 114-1 to generate a fingerprint of the video stream being transmitted to the end users 116 at exactly "8:00:20 pm," which is "8:00:00 pm" adjusted by the twenty-second time offset. Systems and methods for generating these time offsets and using them to generate requests are also discussed in relation to FIG. 6 and FIG. 7.

For illustrative purposes, FIG. 1 depicts only a single fingerprint database 120. However, it is understood that there may be any number of fingerprint databases distributed throughout the distribution network 100. For example, each of the nodes 114 may maintain a local fingerprint database, which may be used to store fingerprints generated from video streams received or transmitted by the nodes 114 over different communication paths (e.g., communication paths 104, 112, 118, or 126). In turn, these fingerprints may be used to determine relative time offsets between the video signals received and transmitted at the various nodes 114 in distribution network 100. For example, node 114-1 may compare fingerprints generated from video transmission received at end user 116-1 to a a local fingerprint database, and determine a time offset between the video signal transmitted from node 114-1, and the video signal being received by end user 116-1. In some embodiments, the node 114-1 may store this time offset locally, or node 114-1 may transmit this information to a centralized time offset database (e.g., offset database 122).

In general, the offsets in the offset database 122 may be stored along with information indicating the particular node that the time offset was calculated for, and the total amount of time offset. Other metadata, such as the particular communication path the time offset pertains to, or the original source of the video stream used to calculate the time offset, may be included as well. For example, a typical entry in the offset database 122 may include some or all of the following information:

Time Offset: "20.000 sec"
Feature Number: 001
Time Stamp: "07:29:41:10 pm"
Node Time Zone: EST
Node: Broadcast Station XYZ
Content Source: Main Facility ABC
Transmission Path: "Satellite 1"

This example entry includes "Time Offset," which corresponds to the actual time offset represented in a total number of seconds. In general, a typical distribution delay may be on the order of a few seconds to a minute. For instance, in the example listed above, the total time offset is twenty seconds. The "Feature Number" portion of the entry identifies the type of feature that was used to determine the time offset in the database. For example, the feature number may identify a particular type of fingerprint or other watermark that was used to determine the time offset. The "Time Stamp" and "Node Time Zone" portion of the entry may indicate that the time offset was measured based on the transmission made to or from a given node at "07:29:41:10 pm" within the eastern time zone, "EST." This information may be particularly useful since the time offsets may change over time, due to changing conditions within the distribution network, and historical data of previous time offsets determined in the past may be used by control circuitry (e.g., control circuitry 124) for any number of purposes. The "Node" portion of the entry generally includes information indicative of the node (e.g., a broadcasting station or distribution point) that a particular time offset pertains to. For instance, in the example above, the twenty-second time offset was calculated as the delay between transmitting a video stream to "Broadcast Station XYZ," and the retransmission of the video stream by "Broadcast Station XYZ" to end users (e.g., end users 116). The "Content Source" generally includes information indicative of the originally location that transmitted the video stream to the node. For instance, in the example above, the "Content Source" information specifies that there is a twenty-second time offset between a video stream being transmitted from "Main Facility ABC" to "Broadcast Station XYZ," and the video stream being retransmitted by "Broadcast Station XYZ" to end users. It is understood that, in some embodiments, the "Content Source" may itself be a node with distribution network 100 (e.g., one of nodes 114), and that time offsets may be calculated between any of the various entities (e.g., nodes 114 or end users 116) within distribution network 100. Finally, the "Transmission Path" portion of the entry in the offset database 122 may indicate which of the communication paths (e.g., which of communication paths 104 or 126) the time offset pertains to. For instance, in the example above, it is indicated that there is a twenty-second time offset between a video stream being transmitted from "Main Facility ABC" to "Broadcast Station XYZ," over the "Satellite 1" communication path, and the video stream ultimately being retransmitted by "Broadcast Station XYZ" to end users. It is understood that the example above is merely illustrative, and entries in offset database 122 may contain any suitable mixture of time offset data and appropriate metadata about the time offsets stored in the entries.

Figure 2:
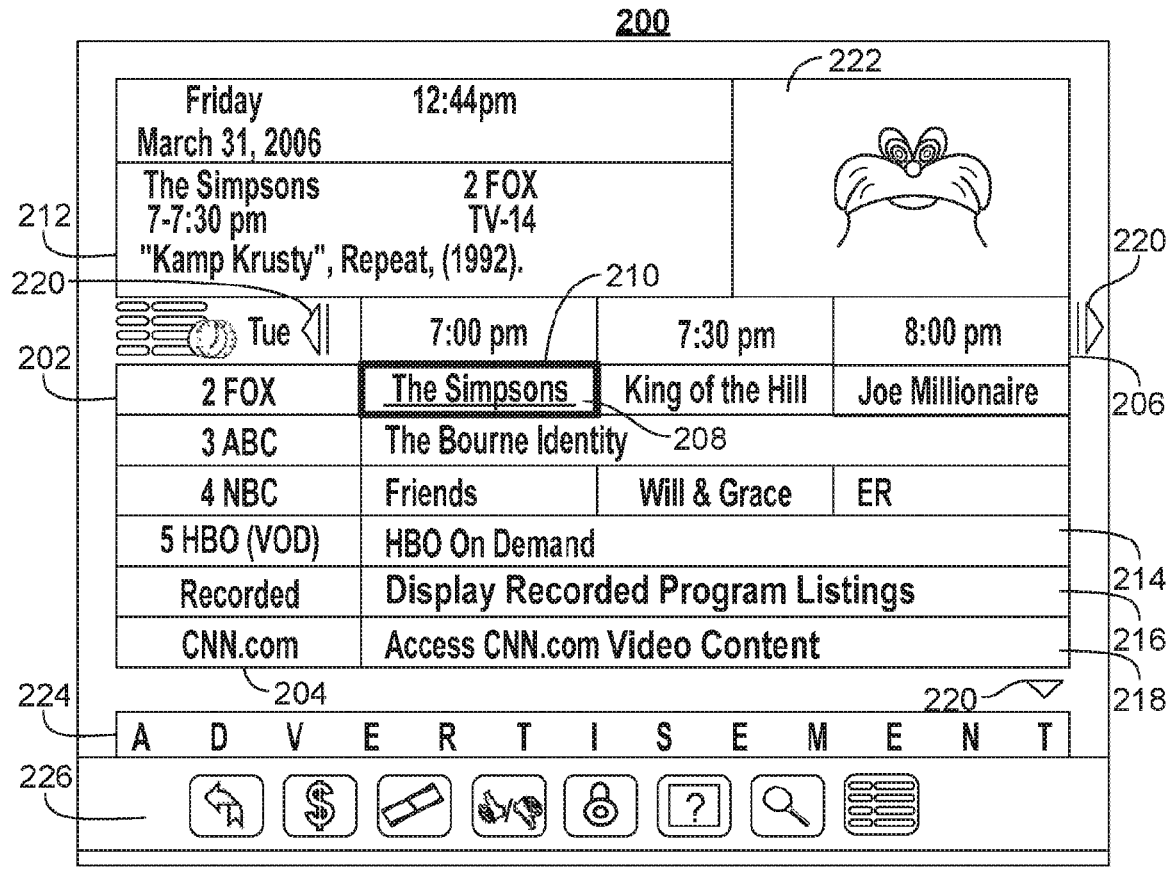
FIG. 2 shows an illustrative example of a display screen for use in accessing media content in accordance with some embodiments of the disclosure.
Figure 3:
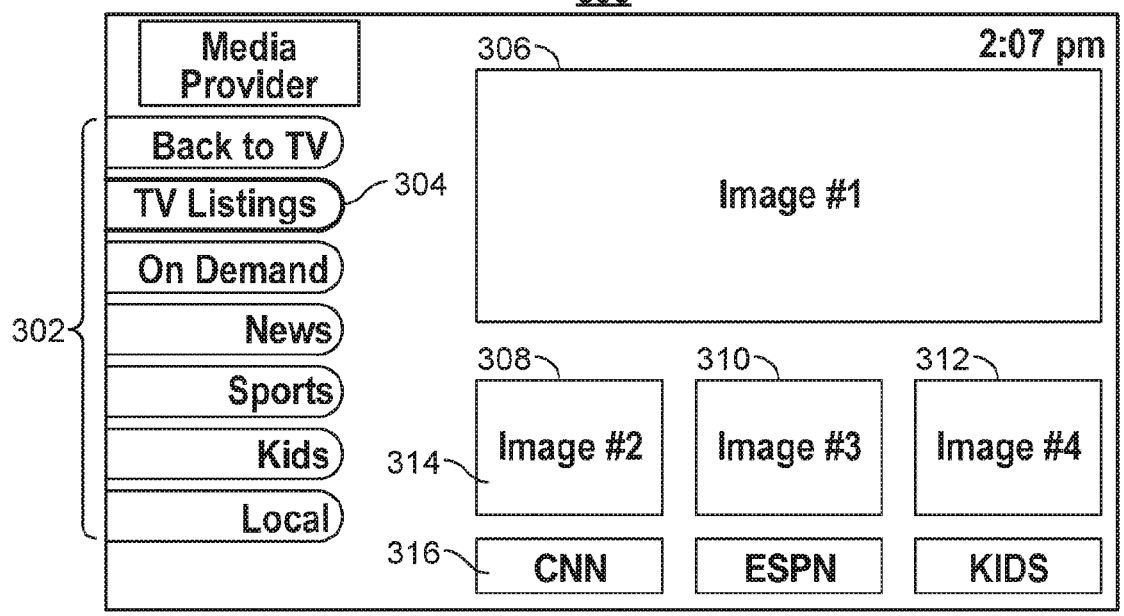
FIG. 3 shows another illustrative example of a display screen used to access media content in accordance with some embodiments of the disclosure.

FIGS. 2-3 show illustrative display screens that may be used to provide media guidance data (e.g., media guidance data provided from main facility 102 by control circuitry 124 (FIG. 1)). The display screens shown in FIGS. 2-3 may be implemented on any suitable user equipment device or platform. For example, on user equipment being operated within the homes of end users 116 (FIG. 1). While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Each of the channels may, for example, correspond to a video stream transmitted to an end user 116 from a node 114, which in turn originates from a content source such as main facility 102. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP). In general, a content provider may operate main facility 102 (FIG. 1), and provide content to end users (e.g., end users 116 (FIG. 1)) using a suitable communication path, such as any of the communication paths discussed in relation to FIG. 1 or FIG. 5.

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, advertisement 224, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 224 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 202. Advertisement 224 may also be for products or services related or unrelated to the content displayed in grid 202. Advertisement 224 may be selectable and provide further information about content, provide information about a product or a service, enable purchasing of content, a product, or a service, provide content relating to the advertisement, etc. Advertisement 224 may be targeted based on a user's profile/preferences, monitored user activity, the type of display provided, or on other suitable targeted advertisement bases.

While advertisement 224 is shown as rectangular or banner shaped, advertisements may be provided in any suitable size, shape, and location in a guidance application display. For example, advertisement 224 may be provided as a rectangular shape that is horizontally adjacent to grid 202. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. In general, user equipment device 400 may be operated within the home of an end user (e.g., end users 116 (FIG. 1)), and may be configured to receive transmissions or other communications from broadcasters (e.g., nodes 114 (FIG. 1)) or content providers (e.g., a content provider operating main facility 102 (FIG. 1)) through I/O path 402. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data (e.g., guidance data provided from main facility 102 (FIG. 1)). The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400 (e.g., a server running within main facility 102 (FIG. 1)). In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays.

For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some user television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. In some embodiments, paths 508, 510, and 512 may separately or together include one or more of the communication paths discussed in relation to FIG. 1, such as communication paths 104, 112, 118, or 126. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communication paths 520 and 522 may also connect together a media content source 516 and media guidance data source 522 to any of the hardware or systems discussed in relation to FIG. 1 (e.g., main facility 102 or nodes 114). In general, content source 516 and media guidance data source 518 may be one and the same with the main facility 102 or nodes 114, and the paths 520 and 522 may include at least a portion of one or more of the communication paths discussed in relation to FIG. 1 (e.g., communication paths 104, 112, 118, or 126 (FIG. 1)). Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a web site via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
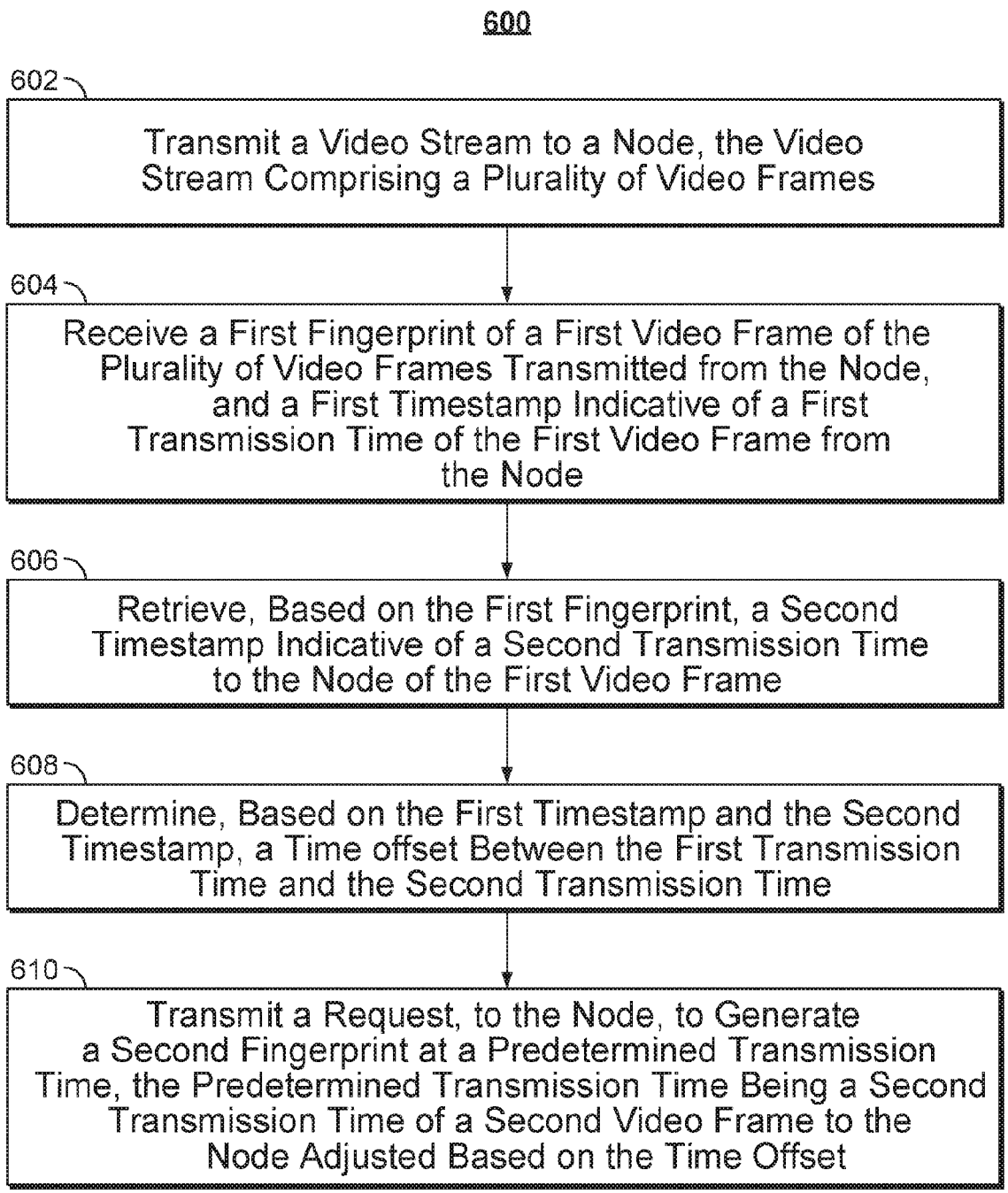
FIG. 6 is a flowchart of illustrative steps for monitoring content distribution, in accordance with some embodiments of the disclosure.

FIG. 6 is a flowchart of illustrative steps for monitoring content distribution, in accordance with some embodiments of the disclosure. For example, a content provider (e.g., a content provider operating main facility 102 (FIG. 1)) may implement process 600 through the use of control circuitry at a central location (e.g., control circuitry 124), or through control circuitry working in tandem with any of the devices discussed in relation to FIG. 4 or FIG. 5.

Process 600 begins at 602, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) transmits a video stream to a node (e.g., one of nodes 114 (FIG. 1)), the video stream comprising a plurality of video frames. For example, the video stream may correspond to an ongoing televised sports game, "Red Sox vs. Yankees," provided by a media content source (e.g., media content source 516 (FIG. 5)). In general, the video stream may be any suitable type of media, such as a television show, film, streaming video, on-demand program, or the like. In general, control circuitry 124 may be configured to transmit the video stream to nodes 114 with the expectation that nodes 114 will in turn retransmit the video stream to other nodes (e.g., intermediary nodes) or end users over a suitable communication path (e.g., to end users 116 over communication paths 118 (FIG. 1) or via communication path 520 and communication network 514 (FIG. 5)). For instance, main facility 102 may provide raw footage of the televised sports game "Red Sox vs. Yankees" originating from a media content source (e.g., media content source 516 (FIG. 5)) to various distribution points or broadcasting affiliates (e.g., nodes 114). In turn, nodes 114 may manipulate the frames in the video stream by adding logos and custom branding, or by inserting supplemental content into the video stream, and transmit the modified video stream to end users 116. For instance, if node 114-1 was an affiliate of the "Fox" network operating within the city of "New York," the node 114-1 may overlay a "Fox" network logo onto the bottom right corner of the images in the video stream before transmitting the video stream to end user 116-1. As an alternate example, the node 114-1 may insert local news alerts for the area surrounding the city of "New York" in between portions of the video stream that will be temporarily presented to end user 116-1 in place of the video stream. In order to determine whether or not a particular one of nodes 114 is retransmitting the video stream, the control circuitry 124 may be configured to receive and analyze fingerprints or other identifying information derived from the copies of the video stream transmitted from nodes 114 (e.g., copies of a video stream transmitted to end users 116 along communication paths 118).

Process 600 continues to 604, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) receives a first fingerprint of a first video frame of the plurality of video frames transmitted from the node (e.g., transmitted by nodes 114 to end users 116 along communication paths 118 (FIG. 1), or through communication path 520 and communication network 514 (FIG. 5)), and a first timestamp indicative of a first transmission time of the first video frame from the node. For example, if the first video frame was taken from the copy of the televised sports game "Red Sox vs. Yankees" transmitted by the node 114-1 at precisely "07:30:01 pm," the control circuitry 124 may receive a copy of the fingerprint of the first video frame, as well as a timestamp indicating that the fingerprint corresponds to the video frame transmitted by the node 114-1 at "07:30:01 pm."

In some embodiments, the control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) may receive the first fingerprint directly from the node (e.g., via communication path 104 connecting the main facility 102 to node 114-1 (FIG. 1), or via communications network 514 and communication paths 520 or 522 (FIG. 5)). For example, the node 114-1 may include its own control circuitry configured to generate the fingerprint directly from a video frame transmitted along communication path 118-1, and transmit the generated fingerprint back to control circuitry 124 within main facility 102. In some embodiments, the control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) may receive the first fingerprint indirectly. For example, control circuitry 124 may be configured to receive at least a portion of the video frame transmitted by the node (e.g., via communication path 104 connecting the main facility 102 to node 114-1 (FIG. 1)), and generate the fingerprint directly from the received portion. For example, the control circuitry 124 may receive an image of the video frame transmitted by the node 114-1 at precisely "07:30:01 pm," and may generate a fingerprint by extracting a watermark or unique set of spectral components from the video frame. In some embodiments, the control circuitry 124 may receive the first fingerprint by first receiving a copy of the video stream transmitted by node 114-1 at a suitable receiving device or listening station (e.g., a receiver located within the home of end user 116-1). In this case, the copy of the video steam may be transmitted back to the portion of control circuitry 124 operating within main facility 102, and control circuitry 124 may be configured to generate the fingerprint. In some embodiments, control circuitry 124 may retrieve the first fingerprint from a suitable media guidance data source (e.g., media guidance data source 518 (FIG. 5) where the first fingerprint has previously been stored.

Process 600 continues to 606, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) retrieves, based on the first fingerprint, a second timestamp indicative of a second transmission time to the node of the first video frame (e.g., any of nodes 114 (FIG. 1)). For example, control circuitry 124 may search fingerprint database 120, and identify an entry within fingerprint database 120 with fingerprint data matching the first fingerprint. Control circuitry 124 may then retrieve a timestamp stored within the identified entry of the fingerprint database. For instance, if the entry corresponds to a fingerprint generated based on a particular frame of the televised sports game "Red Sox vs. Yankees" transmitted to nodes 114 at precisely "07:29:41 pm," the control circuitry 124 may retrieve the timestamp "07:29:41 pm."

Process 600 continues to 608, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) determines, based on the first timestamp and the second timestamp, a time offset between the first transmission time and the second transmission time. For example, if the control circuitry 124 received a first timestamp indicating that the first fingerprint corresponded to the video frame of the televised sports game "Red Sox vs. Yankees" transmitted by the node 114-1 at "07:30:01 pm," and retrieved a second timestamp indicating that particular frame of the televised sports game "Red Sox vs. Yankees" was transmitted to nodes 114 at precisely "07:29:41 pm," the control circuitry 124 may determine that there is a twenty-second offset between the first transmission time and the second transmission time by calculating a difference between the timestamps. In some embodiments, control circuitry 124 may store this time offset as an entry within offset database 122, and may later retrieve this time offset from the entries of offset database 122 when it is to be used in generating requests to be transmitted to nodes 114.

Process 600 continues to 610, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) transmits a request to the node (e.g., one of nodes 114 (FIG. 1)), to generate a second fingerprint at a predetermined transmission time, the predetermined transmission time being a second transmission time of a second video frame to the node adjusted based on the time offset. For example, control circuitry 124 may be configured to determine whether or not node 114-1 retransmitted the portion of the televised sports game "Red Sox vs. Yankees," transmitted to the node by the media provider at "8:00:00 pm" (e.g., by retransmitting that portion to end user 116-1 through communication path 118-1). In this case, if the control circuitry determined that there is a twenty-second time offset for node 114-1, the control circuitry may transmit a request to generate a fingerprint of the video frame transmitted by node 114-1 at "8:00:20 pm."

In some embodiments, the control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) may calculate the predetermined transmission time, and transmit the predetermined transmission time to the node (e.g., one of nodes 114 (FIG. 1)) as part of the transmitted request. For example, control circuitry 124 may calculate the predetermined transmission time "8:00:20 pm" directly from the second transmission time of the second video frame to the node, "8:00:00 pm," and the time offset of twenty seconds for the node 114-1. In this example, the control circuitry 124 may then proceed to directly transmit a request to node 114-1 to generate a fingerprint of the video frame transmitted to end user 116-1 through communication path 118-1 at precisely "8:00:20 pm."

In some embodiments, the control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) may transmit a request comprising instructions for the node (e.g., one of nodes 114 (FIG. 1)) to calculate the predetermined transmission time. For example, control circuitry 124 may store the time offset in offset database 122. Control circuitry 124 may then transmit a request for node 114-1 to generate a fingerprint based on the fingerprint transmitted to the node at "8:00:00 pm," and whatever time offset value is stored for node 114-1 in offset database 122. In this case, node 114-1 may independently retrieve the appropriate time offset from offset database 122, determine the predetermined transmission time, and set a reminder to generate the fingerprint at the predetermined transmission time. By providing requests to nodes 114-1 in this manner, it may reduce the number of calculations that must be performed by control circuitry 124, and distribute the computational load across the media distribution network.

Figure 7:
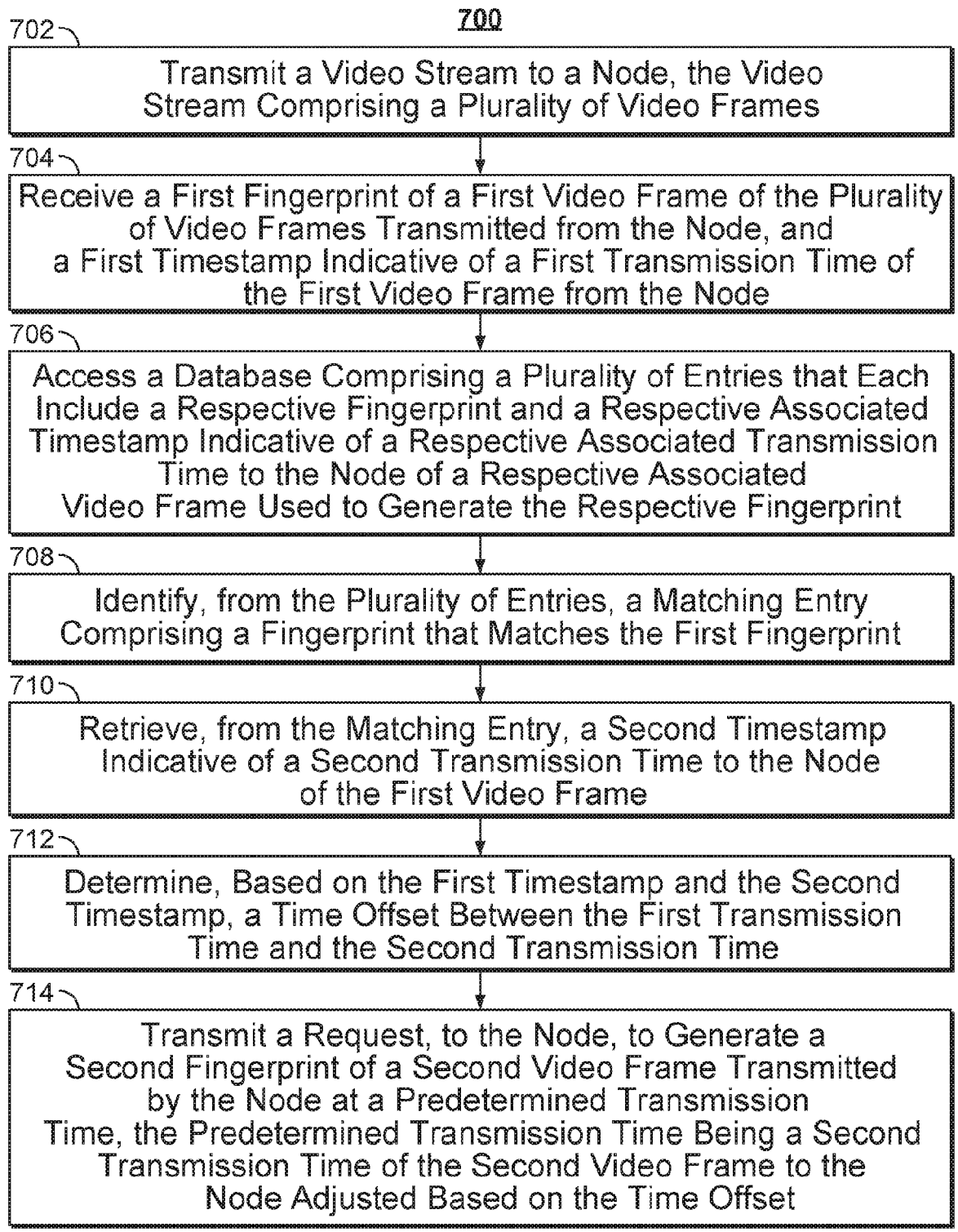
FIG. 7 is a flowchart of another set of illustrative steps for monitoring content distribution, in accordance with some embodiments of the disclosure.

FIG. 7 is a flowchart of another set of illustrative steps for monitoring content distribution, in accordance with some embodiments of the disclosure. Process 700 begins at 702, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) transmits a video stream to a node (e.g., one of nodes 114 (FIG. 1)), the video stream comprising a plurality of video frames. In general, a media provider such as a multichannel video programming distributor (MVPD) (e.g., a media provider operating main facility 102, or a media content source 516 (FIG. 5)) may implement a system (e.g., using control circuitry 124, control circuitry 402 (FIG. 4), or control circuitry distributed throughout any of the hardware and systems discussed in relation to FIG. 1, FIG. 4, or FIG. 5) to transmit television channels or other video content to various nodes (e.g., nodes 114) spread across the country. For instance, control circuitry 124 may transmit a video stream containing a copy of a particular televised sports game, "Red Sox vs. Yankees," to a local node (e.g., node 114-1) affiliated with the "Fox" network. This video stream may be made up of individual video frames, which may be retransmitted to end users (e.g., retransmitted from node 114-1 to end user 116-1 over communication path 118-1 (FIG. 1)), and is presented to end users on an appropriate display device (e.g., display 412 (FIG. 4)) at a suitable rate (e.g., 24 frames per second). This transmission may be made over a cable connection, a satellite connection, or any other type of suitable wired or wireless connection (e.g., communication paths 104, 112, 118, or 126 (FIG. 1) or communication paths 520, 522 or communications network 512 (FIG. 5)).

In some embodiments, the node is a first node (e.g., node 114-1), and the control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) transmits the video stream to the first node by identifying, from a node subscription database, one or more nodes in addition to the first node to which the video stream is to be transmitted (e.g., node 114-2). For example, the control circuitry may be configured to transmit a copy of the televised sports game "Red Sox vs. Yankees," from a media content provider (e.g., media content source 516 (FIG. 5)) to a number of different nodes (e.g., nodes 114) or other distribution points located in the Northeastern United States, and transmit a different sports game to other nodes located in other portions of the United States. In this case, the control circuitry may use a node subscription database to determine the appropriate nodes that should receive the televised sports game "Red Sox vs. Yankees." The control circuitry then simultaneously transmits the video stream to each of the one or more nodes and the first node over a common communication path. For example, after determining that nodes 114-1 and 114-2 are to receive the video stream, control circuitry 124 may be configured to transmit the televised sports game "Red Sox vs. Yankees" to nodes 114-1 and 114-2 over a common communication path (e.g., communication path 104).

Process 700 continues to 704, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) receives a first fingerprint of a first video frame of the plurality of video frames transmitted from the node (e.g., transmitted from one of nodes 114 to end users 116 over communication paths 118 (FIG. 1)), and a first timestamp indicative of a first transmission time of the first video frame from the node. For example, a node 114-1 may receive the video stream corresponding to the televised sports game "Red Sox vs. Yankees" from main facility 102 over communication path 104, and retransmit the video stream to end user 116-1 over communication path 118-1. In this case, a fingerprint may be generated from one of the video frames in the video stream of the televised sports game "Red Sox vs. Yankees" transmitted by node 114-1, and communicated to control circuitry 124 (e.g., over communication path 104 (FIG. 1), or via communication path 522 from a media guidance data source 518 (FIG. 5) where the fingerprint was previously stored) along with a timestamp indicating when that particular video frame was transmitted from the node. For instance, if the fingerprint was generated from the video frame being transmitted by node 114-1 at exactly "07:30:01 pm," the control circuitry may receive a copy of the fingerprint, as well as a timestamp indicating that the fingerprint corresponds to the video frame transmitted at "07:30:01 pm."

In some embodiments, the control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) receives the first fingerprint by receiving, from the node (e.g., from node 114-1 over communication path 104 (FIG. 1)), at least a portion of the first video frame of the plurality of video frames transmitted from the node (e.g., a portion of the video frame transmitted from node 114-1 to end user 116-1 over communication path 118-1). For example, control circuitry 124 may receive a copy of the entire video frame, or a smaller portion of the video frame containing a particular type of watermark, a channel logo, or other identifying feature. The control circuitry 124 then samples the at least a portion of the first video frame. For example, the control circuitry 124 may attempt to extract a watermark from the received portion of the video frame, or decompose the portion of the video frame into spectral components by applying a suitable spectral analysis technique. Control circuitry 124 then determines, from the sample, unique characteristics of the first video frame. For example, control circuitry 124 may determine if there is a particular unique watermark, or unique set of spectral components associated with the video frame. Control circuitry 124 then generates, as the first fingerprint, a unique fingerprint based on the unique characteristics of the first video frame. For example, control circuitry 124 may generate the fingerprint from a watermark or set of extracted spectral components that uniquely identifies the video frame.

Process 700 continues to 706, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) accesses a database (e.g., fingerprint database 120 housed within media guidance data source 518 (FIG. 5)) comprising a plurality of entries, each of which includes a respective fingerprint and a respective associated timestamp indicative of a respective associated transmission time to the node (e.g., a transmission time from main facility 102 to one of nodes 114 (FIG. 1)) of a respective associated video frame used to generate the respective fingerprint. For example, control circuitry 124 may access fingerprint database 120, which may be maintained by a content provider operating main facility 102. In general, fingerprint database 120 may be populated by control circuitry 124 with entries corresponding to the different video frames that make up the transmitted video stream (e.g., entries corresponding to video frames for each of the transmissions made to nodes 114 over communication paths 104, 112, or 126 (FIG. 1)). Each entry in fingerprint database 120 may include a fingerprint of a given video frame, metadata about the video frame, and a timestamp indicating when that particular video frame was transmitted to the node. For instance, if the video stream corresponds to a copy of the televised sports game, "Red Sox vs. Yankees," transmitted to node 114-1 from main facility 102, fingerprint database 120 may contain entries for each of the video frames of the televised sports game "Red Sox vs. Yankees" transmitted to node 114-1 within the past two minutes. This may reduce the overall size of fingerprint database 120, and reduce the number of resources required to operate fingerprint database 120.

Process 700 continues to 708, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) identifies, from the plurality of entries, a matching entry comprising a fingerprint that matches the first fingerprint. For example, control circuitry 124 may search the entries in fingerprint database 120 within media guidance data source 518, and determine that the received fingerprint matches the fingerprint of a particular entry in fingerprint database 120 corresponding to the video frame of the sports game "Red Sox vs. Yankees" transmitted to the node at exactly "07:29:41 pm." In some embodiments, control circuitry 124 may search only the entries corresponding to video frames transmitted to node 114-1 within the past minute, within one minute of a time indicated on the first timestamp, or within some suitable threshold period of time. For example, if the control circuitry 124 received a timestamp at 704 indicating that the first fingerprint corresponds to the video frame transmitted by node 114-1 at "07:30:01 pm," control circuitry 124 may search fingerprint database 120 for matching entries from within the subset of entries corresponding to video frames transmitted to node 114-1 between "07:29:01 pm" and "07:30:01 pm."

In some embodiments, the video stream is transmitted (e.g., via control circuitry 124 within main facility 102 (FIG. 1) or from a media content source 516 (FIG. 5)) to the node over a first communication path (e.g., to node 114-1 over communication path 104 (FIG. 1), or a communication path including 520 (FIG. 5)), and the control circuitry identifies the matching entry (e.g., the matching entry from fingerprint database 120 (FIG. 1)) by identifying, from the plurality of entries, a plurality of matching entries comprising a fingerprint that matches the first fingerprint, each of the plurality of matching entries including a respective indication of an associated communication path used to transmit the respective associated video frame used to generate the respective fingerprint. In general, control circuitry 124 may transmit the video stream to different nodes over different communications paths. For example, the video stream corresponding to the televised sports game "Red Sox vs. Yankees" may be transmitted to node 114-1 over a cable connection (e.g., communication path 104), and node 114-3 over a satellite connection (e.g., communication path 126). In this case, the control circuitry may store and differentiate between two sets of fingerprints in fingerprint database 120 (e.g., a fingerprint database 120 stored within a media guidance data source 518 (FIG. 5)), the first set corresponding to the video frames transmitted via communication path 104, and the second set corresponding to the video frames transmitted via communication path 126. For instance, the entries in fingerprint database 120 may include a fingerprint generated from a particular video frame (e.g., a video frame of video stream transmitted to node 104A (FIG. 1)), along with an indication of what type of communication path was used to transmit that video frame to the node (e.g., information indicating that communication path 104 was used to transmit the video frame to node 114-1 (FIG. 1), or information indicating that the communication path included transmissions through communication paths 520 (FIG. 5)). In this case, control circuitry 124 may identify several entries in fingerprint database 120 matching the received fingerprint, one entry for each of the communication paths used to transmit the video stream. For instance, control circuitry 124 may identify one entry in fingerprint database 120 corresponding to the video frame of the televised sports game "Red Sox vs. Yankees" transmitted via communication path 104 at "07:29:41 pm," and another entry corresponding to the video frame of the televised sports game "Red Sox vs. Yankees" transmitted via communication path 126 at "07:29:51 pm." The control circuitry then identifies, as the matching entry, an entry from the plurality of matching entries with an indication of an associated communication path that matches the first communication path used to transmit the video stream to the node. For example, if the video stream was originally transmitted to node 114-1 over communication path 104 by control circuitry 124, control circuitry 124 may identify the matching entry as the entry corresponding to the video frame of the televised sports game "Red Sox vs. Yankees" transmitted via communication path 104 at "07:29:41 pm."

Process 700 continues to 710, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) retrieves, from the matching entry, a second timestamp indicative of a second transmission time to the node (e.g., node 114-1) of the first video frame. For example, if the matching entry in fingerprint database 120 corresponds to the video frame of the televised sports game "Red Sox vs. Yankees" transmitted to node 114-1 at "07:29:41 pm," control circuitry 124 may retrieve a timestamp indicating that the video frame was transmitted to node 114-1 at "07:29:41 pm."

Process 700 continues to 712, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) determines, based on the first timestamp and the second timestamp, a time offset between the first transmission time and the second transmission time. For example, if control circuitry 124 originally received a timestamp indicating that the video frame was transmitted by node 114-1 at "07:30:01 pm," and used the fingerprint to determine that the video frame was originally transmitted to node 114-1 at "07:29:41 pm," control circuitry 124 may determine a time offset of twenty seconds based on a difference between the two timestamps.

In some embodiments, the time offset is a first time offset, and the control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) determines a plurality of respective time offsets for each respective node of one or more nodes (e.g., for each of nodes 114), each of the plurality of time offsets representing a difference between a respective first transmission time of a respective video frame from a respective node, and a respective second transmission time of the respective video frame to the respective node. For example, control circuitry 124 may be configured to transmit the video stream to multiple nodes (e.g., node 114-1, 114-2, and 114-3), and control circuitry 124 may determine a time offset for each of the nodes that the video stream is transmitted to. For instance, control circuitry 124 may determine that there is a time offset of twenty seconds between a given video frame of the televised sports game "Red Sox vs. Yankees" being transmitted to node 114-1 from a media content source 516 (FIG. 5), and the video frame being retransmitted from node 114-1 (e.g., being retransmitted to end user 116-1 over communication path 118-1). By comparison, control circuitry 124 may determine that there is a time offset of ten seconds between a given video frame being transmitted to node 114-2, and the video frame being retransmitted from node 114-2 (e.g., being retransmitted to end user 116-2 over communication path 118-2). Control circuitry 124 then stores each of the plurality of respective time offsets with the first time offset in a time offset database (e.g., offset database 122 stored within media guidance data source 518 (FIG. 5)). For instance, control circuitry 124 may include entries in offset database 122 for each of the time offsets calculated for the different nodes 114. In general, control circuitry 124 may maintain offset database 122, and populate it with entries representing time offsets. The entries in offset database 122 may be accessible to one or more content providers (e.g., a content provider operating main facility 102 (FIG. 1) as a media content source 516 (FIG. 5)), and control circuitry 124 may use the time offset stored in offset database 122 for a particular node (e.g., one of nodes 114 (FIG. 1)) when providing instructions or interpreting communications from that particular node.

Process 700 continues to 714, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) transmits a request, to the node (e.g., one of nodes 114 (FIG. 1)), to generate a second fingerprint of a second video frame transmitted by the node at a predetermined transmission time, the predetermined transmission time being a second transmission time of the second video frame to the node adjusted based on the time offset. For instance, control circuitry 124 may be configured to determine whether or not node 114-1 retransmits the portion of the televised sports game "Red Sox vs. Yankees," transmitted from main facility 102 to node 114-1 at "8:00:00 pm." In this case, control circuitry 124 may have determined that there is a time offset of twenty seconds for node 114-1 (e.g., as determined at 712 or determined by retrieving an appropriate time offset from entries in offset database 122 (FIG. 1)), and control circuitry 124 may transmit a request (e.g., via communication path 104) to generate a fingerprint of the video frame transmitted by node 114-1 at "8:00:20 pm" (e.g., transmitted from node 114-1 to end user 116-1 over communication path 118-1), which is the transmission time of the second video frame to node 114-1, "8:00:00 pm," adjusted based on the twenty-second time offset. In some embodiments, a fingerprint may then be made of the video frame transmitted by the node at the predetermined transmission time, and stored in a fingerprint database (e.g., offset database 122 stored within media guidance data source 518 (FIG. 5)).

In some embodiments, based on transmitting the request to the node (e.g., node 114-1), the control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) receives the second fingerprint of the second video frame transmitted by the node at the predetermined transmission time. For example, after control circuitry 124 transmits the request to node 114-1 to generate a fingerprint of the video frame transmitted by node 114-1 at "8:00:20 pm," node 114-1 may generate the fingerprint at the appropriate time, and transmit the appropriate fingerprint back to control circuitry 124. In general, control circuitry 124 may use this fingerprint to determine whether or not node 114-1 properly retransmitted the video stream provided from main facility 102. Depending on whether or not node 114-1 properly retransmitted the video stream, control circuitry 124 may generate one of several different alerts, and take different actions. Some of these alerts, and some of the actions that may be taken, are discussed in relation to FIGS. 8-10.

In some embodiments, the control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) may be configured to determine whether or not a common video stream is being transmitted by multiple nodes (e.g., multiple of nodes 114). For instance, in some embodiments the node is a first node (e.g., node 114-1 (FIG. 1)), the predetermined time is a first predetermined time, the time offset is a first time offset, and the control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5), transmits the video stream to a second node (e.g., node 114-2 (FIG. 1)) simultaneously with the transmission to the first node. For example, in addition to control circuitry 124 transmitting a copy of the televised sports game "Red Sox vs. Yankees" from a media content source (e.g., media content source 516 (FIG. 5)) to node 114-1 over communication path 104, control circuitry 124 may be configured to transmit a copy of the same televised sports game "Red Sox vs. Yankees" to node 114-2. The control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) then transmits a request, to the second node (e.g., node 114-2 (FIG. 1)), to generate a fourth fingerprint of a fourth video frame transmitted by the second node at a second predetermined transmission time (e.g., a video frame transmitted by node 114-2 to end users 116-2 and 116-3 over communication path 118-2 (FIG. 1)), the second predetermined transmission time being the second transmission time adjusted based on a second time offset. For example, if control circuitry 124 determines that node 114-2 has a time offset of ten seconds (e.g., as determined by retrieving the time offset for node 114-2 from the offset database 122 (FIG. 1)), control circuitry 124 may transmit a request to node 114-2 to generate a fingerprint of the video frame transmitted from node 114-2 at the predetermined transmission time, "8:00:10 pm." This predetermined transmission time may be the transmission time of the second video frame to nodes 114-1 and 114-2, "8:00:00 pm," adjusted based on the ten-second time offset associated with node 114-2. In response to transmitting the request to the second node (e.g., node 114-2 (FIG. 1)), the control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) receives the fourth fingerprint of the fourth video frame transmitted by the second node at the second predetermined transmission time. For example, control circuitry 124 may receive the fingerprint of the video frame transmitted by node 114-2 at "8:00:10 pm." The control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) then determines whether the second fingerprint of the second video frame transmitted by the first node (e.g., node 114-1 (FIG. 1)) matches the fourth fingerprint of the fourth video frame transmitted by the second node (e.g., node 114-2 (FIG. 1)). For example, control circuitry 124 may determine whether the fingerprint of the video frame transmitted by node 114-1 at "8:00:20 pm" matches the fingerprint of the video frame transmitted by node 114-2 at "8:00:10 pm." In response to determining that the second fingerprint matches the fourth fingerprint, the control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) generates a third alert indicating that the first node and the second node (e.g., nodes 114-1 and 114-2 (FIG. 1)) made matching transmissions. For example, control circuitry 124 may generate an alert indicating that both node 114-1 and 114-2 are transmitting the televised sports game "Red Sox vs. Yankees" to the end users 116. Alternately, in response to determining that the second fingerprint does not match the fourth fingerprint, the control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) generates a fourth alert indicating that the first node and the second node (e.g., nodes 114-1 and 114-2 (FIG. 1)) did not make matching transmissions. For example, control circuitry 124 may generate an alert indicating that nodes 114-1 and 114-2 are not transmitting the same video stream provided by media content source 516.

Figure 8:
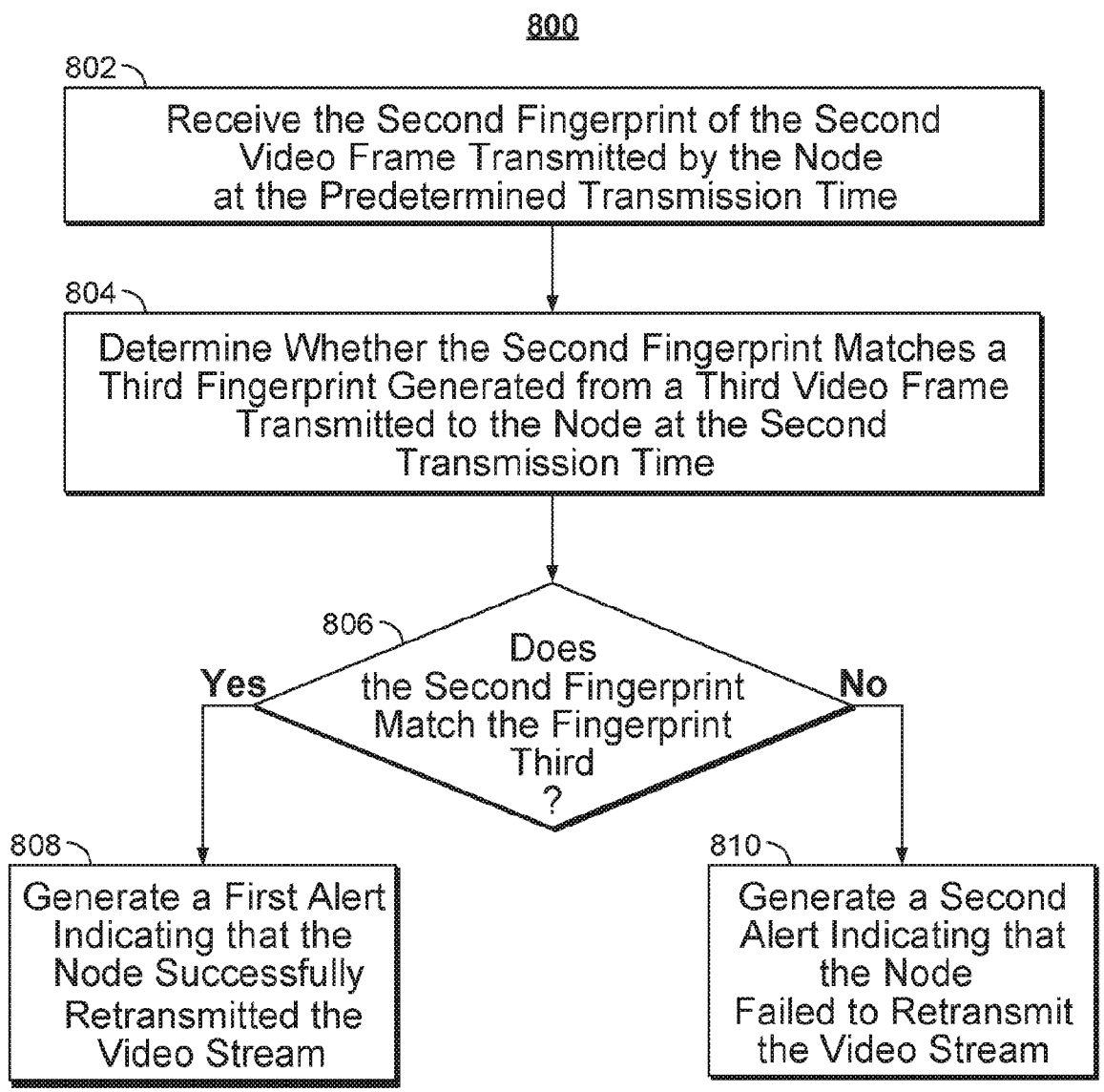
FIG. 8 is a flowchart of illustrative steps for generating basic alerts based on monitored transmissions, in accordance with some embodiments of the disclosure.

FIG. 8 is a flowchart of illustrative steps for generating basic alerts based on monitored transmissions, in accordance with some embodiments of the disclosure. Process 800 begins at 802, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) receives the second fingerprint of the second video frame transmitted by the node (e.g., one of nodes 114 (FIG. 1)) at the predetermined transmission time. For example, if control circuitry 124 transmitted a request to node 114-1 to generate a fingerprint of the video frame transmitted by node 114-1 at "8:00:20 pm" (e.g., as a result of performing a portion of process 600 (FIG. 6) or process 700 (FIG. 7)), control circuitry 124 may receive a fingerprint of the video frame transmitted by node 114-1 transmitted to end user 116-1 over communication path 118-1 at "8:00:20 pm."

Process 800 continues to 804, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) determines whether the second fingerprint matches a third fingerprint generated from a third video frame transmitted to the node (e.g., one of nodes 114 (FIG. 1)) at the second transmission time. For example, control circuitry 124 may have requested that node 114-1 generate a fingerprint generate a fingerprint of the video frame transmitted by node 114-1 at "8:00:20 pm" on the expectation that this will correspond to the video frame originally transmitted from main facility 102 to node 114-1 at "8:00:20 pm." In this case, control circuitry 124 may compare the received fingerprint to a fingerprint previously generated from the video frame transmitted from main facility 102 to node 114-1 at "8:00:00 pm." In general, control circuitry 124 may store fingerprints in fingerprint database 120 corresponding to the video frame transmitted from main facility 102 to nodes 114. This may enable control circuitry 124 to compare the received fingerprint to the previously stored fingerprints in fingerprint database 120 in order to determine if it matches a third fingerprint generated from a third video frame transmitted to one of nodes 114 at a given time. In some embodiments, control circuitry 124 may also determine whether the second fingerprint matches a third fingerprint generated from a third video frame transmitted to the node (e.g., one of nodes 114 (FIG. 1)) at a time sufficiently close to the second transmission time. For example, it is understood that, rather than comparing the received fingerprint to only the fingerprint generated from the video frame transmitted from main facility 102 to node 114-1 at "8:00:00 pm," control circuitry 124 may compare the received fingerprint to any of the fingerprints in fingerprint database 120 generated from the video frame transmitted from main facility 102 to node 114-1 between "7:59:09 pm" and "8:00:01 pm," or another suitable range within a threshold of the original "8:00:00 pm" transmission time. This may enable control circuitry 124 to account for small variations in time offset that may develop, while still enabling control circuitry 124 to perform accurate comparisons and reduce the number of false positives that might otherwise occur from conventional fingerprint-based automatic content recognition (ACR) techniques.

Process 800 continues to 806, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) determines whether the second fingerprint matches the third fingerprint. For example, control circuitry 124 may compare the second fingerprint to the third fingerprint to determine if they are identical, or sufficiently similar to have likely originated from the same video frame of the video stream. For instance, if the fingerprints comprise a set of spectral components (e.g., as determined by decomposing the video frame image), control circuitry 124 may determine if the spectral components are at least 98% similar. If the control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) determines that the second fingerprint matches the third fingerprint, process 800 continues to 808. Alternately, if the control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) determines that the second fingerprint does not match the third fingerprint, process 800 continues to 810.

Process 800 may continue to 808, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) generates a first alert indicating that the node has successfully retransmitted the video stream. For instance, control circuitry 124 may generate an alert indicating that main facility 102 transmitted a portion of the televised sports game "Red Sox vs. Yankees" to node 114-1 at "8:00:00 pm," and node 114-1 properly retransmitted that portion of the televised sports game "Red Sox vs. Yankees," to end user 116-1 via communication path 118-1. In some embodiments, this first alert, or any alert, may be stored within an alert record database. In general, this alert record database may be stored within main facility 102, media content source 516 (FIG. 5), media guidance data source 518 (FIG. 5), or in any other suitable local or remote storage location. Control circuitry 124 may use then use this alert record database to generate a display informing operators within main facility 102 of the status of the video stream being transmitted from node 114-1. In some embodiments, control circuitry 124 may cause supplemental content, such as advertisements, news, alerts, or promotional video, to be delivered to node 114-1 from main facility 102 either directly or indirectly in response to generating the first alert. Transmitting supplemental content to nodes is also discussed in relation to FIG. 10.

Process 800 may continue to 810, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) generates a second alert indicating that the node failed to retransmit the video stream. For instance, control circuitry 124 may generate an alert indicating that main facility 102 or media content source 516 transmitted a portion of the televised sports game "Red Sox vs. Yankees" to node 114-1 at "8:00:00 pm," and node 114-1 failed to properly retransmit that portion of the televised sports game "Red Sox vs. Yankees" to end user 116-1 via communication path 118-1. In some embodiments, this second alert may be stored within an alert record database (e.g., an alert record database within main facility 102 (FIG. 1), media content source 516, or media guidance data source 518 (FIG. 5)), and the contents of the alert record database may be used by control circuitry 124 to generate a display informing operators within main facility 102 or media content source 516 of the status of the video stream being transmitted from node 114-1. In some embodiments, as part of generating the second alert, control circuitry 124 determine whether or not the video stream was properly received by node 114-1 from main facility 102 or media content source 516, and attempt to re-route the transmission along a different communication path. Advanced alerts, and actions that control circuitry 124, may be configured to take as part of generating the second alert, are discussed in relation to FIG. 9.

Figure 9:
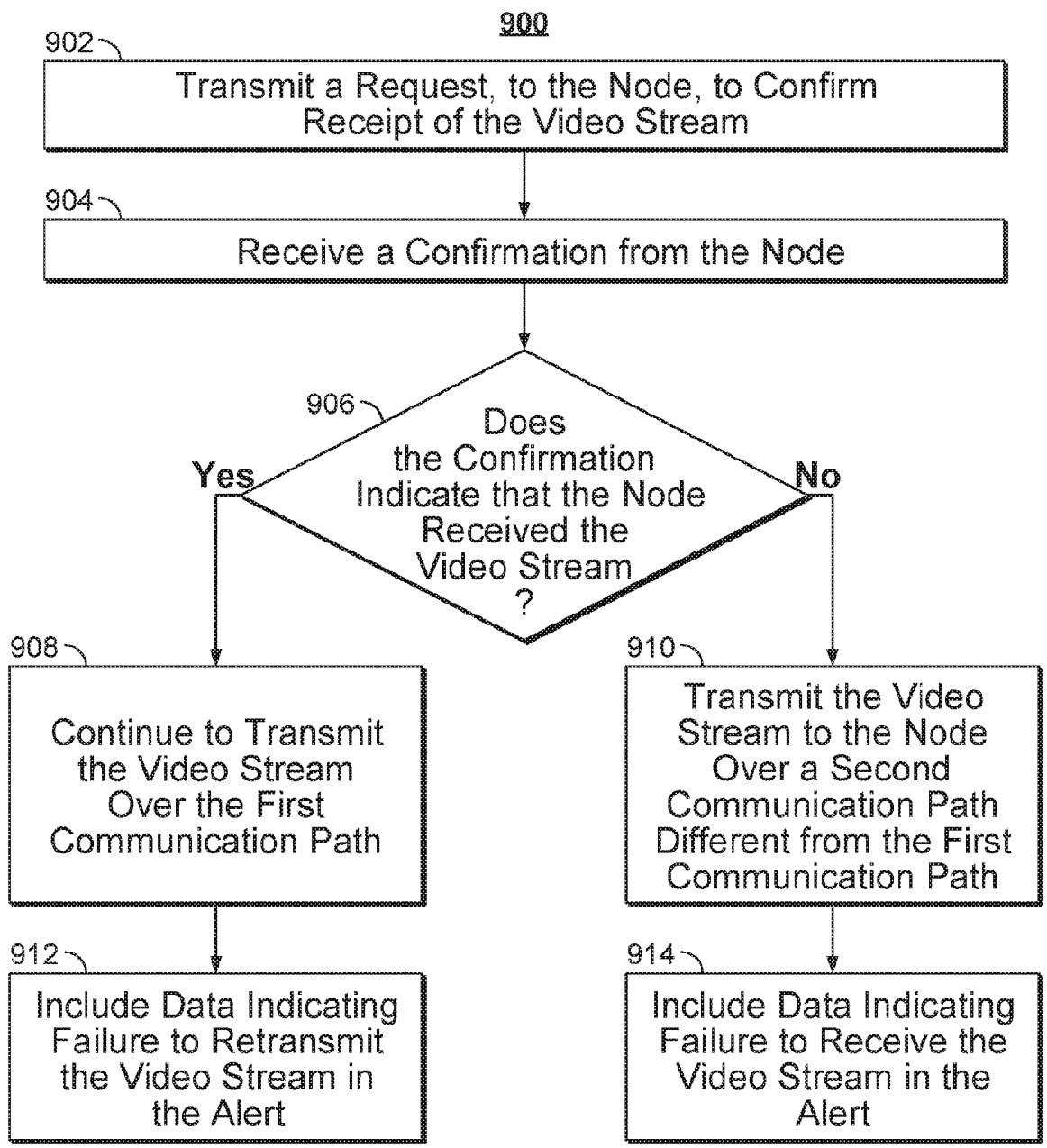
FIG. 9 is a flowchart of illustrative steps for generating more advanced alerts based on monitored transmissions, in accordance with some embodiments of the disclosure.

FIG. 9 is a flowchart of illustrative steps for generating more advanced alerts based on monitored transmissions, in accordance with some embodiments of the disclosure. Process 900 begins at 902, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) transmits a request, to the node (e.g., one of nodes 114 (FIG. 1)), to confirm receipt of the video stream. For instance, control circuitry 124 may generate an alert indicating that node 114-2 failed to rebroadcast part of the televised sports game "Red Sox vs. Yankees" transmitted to node 114-2 from main facility 102 over communication path 104, or similarly transmitted from media content source 516 over communication path 520.

Process 900 continues to 904, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) receives a confirmation from the node (e.g., one of nodes 114 (FIG. 1)). For example, control circuitry 124 may receive a confirmation from node 114-2 based on having transmitted the request to node 114-2 at 902. The confirmation received by control circuitry 124 may be received over any suitable communication path (e.g., communication path 104 (FIG. 1) or communication path 520 via communication network 514 (FIG. 5)), which may or may not be the same as the communication path used to transmit the video stream to node 114-2. For instance, control circuitry 124 may have originally transmitted the video stream to node 114-2 over communication path 104, and received fingerprints and confirmations from node 114-2 over a separate TCP/IP network connection.

[Error! No sequence specified.] Process 900 continues to 906, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) determines whether the confirmation indicates that the node received the video stream. For instance, control circuitry 124 may receive a confirmation from node 114-2 indicating whether or not the node actually received the transmitted copy of the sports game "Red Sox vs. Yankees" provided by a media content source 516 over the first communication path (e.g., communication path 104 or communication path 520). In response to control circuitry 124 determining that the confirmation indicates that node 114-2 received the video stream, process 900 continues to 908. Alternately, in response to control circuitry 124 determining that the confirmation indicates that the node 114-2 did not receive the video stream, process 900 continues to 910.

Process 900 may continue to 908, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) continues to transmit the video stream over the first communication path (e.g., communication path 104 or communication path 520). For example, if control circuitry 124 determines that node 114-2 received the transmitted copy of the sports game "Red Sox vs. Yankees" over communication path 104, but simply chose not to rebroadcast the video stream, control circuitry 124 may continue to transmit the copy of the televised sports game "Red Sox vs. Yankees" to node 114-2 over communication path 104. Process 900 may then continue to 912 from 908, where data is included in the alert (e.g., the alert generated by sub-process 810 (FIG. 8)) indicating that node 114-2 failed to retransmit the video stream.

In some embodiments, instead of continuing to transmit the video stream over the first communication path (e.g., communication path 104) at 908, control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) may cease transmission of the video stream to the node. For example, if control circuitry 124 determines that node 114-1 received the video stream over a given communication path (e.g., communication path 104 (FIG. 1) or communication path 520 (FIG. 5)), but did not retransmit the video stream to end users 116, control circuitry 124 may cease transmission of the video stream to node 114-1 over the given communication path. This may enable control circuitry 124 to preserve bandwidth and system resources for nodes that are still actively retransmitting the video stream. In some embodiments, prior to ceasing transmission of the video stream, control circuitry 124 may transmit a request to node 114-1 to confirm whether or not to continue transmission of the video stream, and control circuitry 124 may cease transmission of the video stream in response to receiving a confirmation to not continue transmission of the video stream.

Process 900 may continue to 910, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) transmits the video stream to the node over a second communication path different from the first communication path (e.g., a communication path other than communication path 104 or communication path 520). For example, if control circuitry 124 determines that node 114-2 never received the copy of the televised sports game "Red Sox vs. Yankees" transmitted from main facility 102 over communication path 104, control circuitry 124 may be configured to instead transmit the video stream to node 114-2 through a different communication path, such as communication path 126. Process 900 may then continue to 914 from 910, where data is included in the alert (e.g., the alert generated by sub-process 810 (FIG. 8)) indicating that node 114-2 failed to receive the video stream.

Process 900 may continue to 912, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) includes data indicating failure to retransmit the video stream in the alert. For example, control circuitry 124 may generate an alert indicating the node that failed to retransmit the video stream, the original time of transmission of the video stream to the node from main facility 102, and any other suitable metadata or data of interest, such as metadata about the video stream as retrieved from media guidance data source 518. The alert may be stored in an alert record database (e.g., an alert record database within main facility 102 (FIG. 1), media content source 516, or media guidance data source 518 (FIG. 5)), and may be used by control circuitry 124 to generate a display of status of distribution system 100.

In some embodiments, the control circuitry generates (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) the second alert (e.g., the alert generated by sub-process 810 (FIG. 8)) by identifying, from the plurality of entries (e.g., the entries in fingerprint database 120 (FIG. 1)), a second matching entry comprising a fingerprint that matches the second fingerprint (e.g., the fingerprint received from one of nodes 114 in response to transmitting a request to generate a fingerprint from main facility 102 (FIG. 1)), the second matching entry comprising an identity of an associated media asset containing the respective associated video frame used to generate the respective fingerprint of the second matching entry. For example, after control circuitry 124 determines that node 114-1 failed to retransmit the video stream containing the televised sports game "Red Sox vs. Yankees," control circuitry 124 may compare the received fingerprint to the other entries in a fingerprint database (e.g., fingerprint database 120 connected within main facility 102

(FIG. 1), or stored within media content source 516 or media guidance data source 518 (FIG. 5)) in order to identify a different video stream that corresponds to the generated fingerprint (i.e., the video stream that node 114-1 was transmitting to end users 116 when the fingerprint was generated). For instance, if node 114-1 was transmitting a video stream containing an episode of the television show "Modern Family" at the time that the fingerprint was generated, control circuitry 124 may identify a matching entry in fingerprint database 120 for a fingerprint generated from a video frame of that episode of "Modern Family." The control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) then retries, from the matching entry, the identity of the associated media asset. For example, control circuitry 124 may retrieve information from an "Associated Broadcast" field within the entry, which may contain the identity of the episode of the television show "Modern Family" that the fingerprint was generated from. The control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) then stores the second alert in an alert record database (e.g., an alert record database within main facility 102 (FIG. 1), media content source 516, or media guidance data source 518 (FIG. 5)), the second alert comprising data indicative of the identity of the associated media asset.

Process 900 may continue to 914, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) includes data indicating failure to receive the video stream in the alert. For example, control circuitry 124 may generate an alert indicating the node 114-2 failed to receive the video stream transmitted from main facility 102 over communication path 104. Other suitable metadata or data of interest may also be included within the alert, such as the original time that the video stream was to be transmitted to node 114-2 from main facility 102, and an identity of the second communication path (e.g., communication path 126 (FIG. 1)) currently being used to transmit the video stream to node 114-2. The alert may be stored in a database or alert record database (e.g., an alert record database within main facility 102 (FIG. 1), media content source 516, or media guidance data source 518 (FIG. 5)), and may be used by control circuitry 124 to generate a display of status of distribution system 100.

Figure 10:
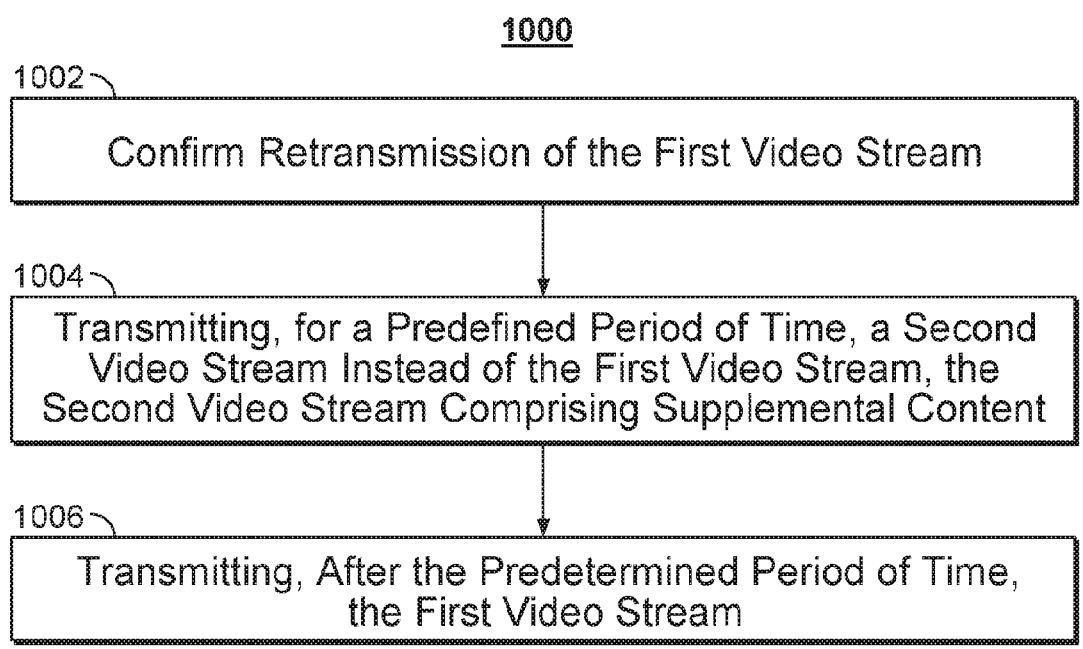
FIG. 10 is a flowchart of illustrative steps for ensuring retransmission of supplemental content, in accordance with some embodiments of the disclosure.

FIG. 10 is a flowchart of illustrative steps for ensuring retransmission of supplemental content, in accordance with some embodiments of the disclosure. Process 1000 begins at 1002, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) confirms retransmission of the first video stream. For example, control circuitry 124 may be generating an alert indicating that node 114-1 properly rebroadcast the portion of the sports game "Red Sox vs. Yankees," transmitted from main facility 102 to node 114-1 over communication path 104 at precisely "8:00:00 pm."

Process 1000 continues to 1004, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) transmits, for a predefined period of time, a second video stream instead of the first video stream, the second video stream comprising supplemental content. For example, instead of providing the video stream of the televised sports game "Red Sox vs. Yankees" from a media content source (e.g., media content source 516 (FIG. 5)) over communication path 104, control circuitry 124 may instead provide node 114-1 with a second video stream containing alerts, advertisements, or promotional materials of a fixed length. In doing so, control circuitry 124 may increase the likelihood of the second video stream being rebroadcast by node 114-1 to end users 116. In some embodiments, the second video stream may contain supplemental content obtained from a media content source (e.g., media content source 516 (FIG. 5)), or derived from information contained within a media guidance data source (e.g., media guidance data source 518 (FIG. 5)).

Process 1000 continues to 1006, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) transmits, after the predetermined period of time, the first video stream. For example, after control circuitry 124 has transmitted the supplemental content to node 114-1 in its entirety, control circuitry 124 may resume transmission of the televised sports game "Red Sox vs. Yankees" to node 114-1 over communication path 104.

Figure 11:
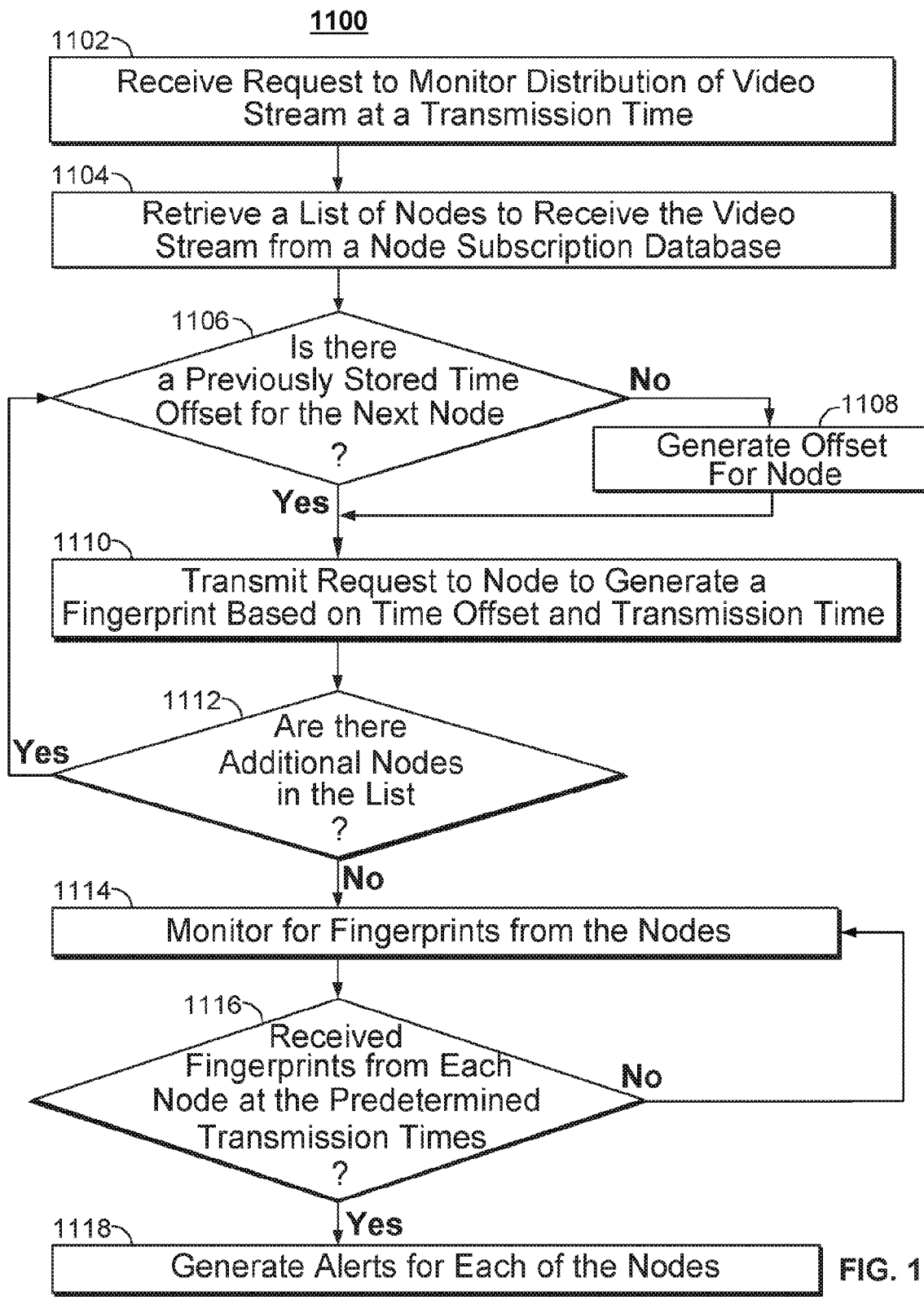
FIG. 11 is a flowchart of illustrative steps for monitoring content distribution, in accordance with some embodiments of the disclosure.

FIG. 11 is a flowchart of illustrative steps for monitoring content distribution, in accordance with some embodiments of the disclosure. Process 1100 begins at 1102, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) receives a request to monitor distribution of a video stream at a transmission time. For example, control circuitry 124 may receive a request to monitor distribution of a televised sports game "Red Sox vs. Yankees" to end users 116 via nodes 114.

Process 1100 continues to 1104, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) retrieves a list of nodes to receive the video stream from a node subscription database. For example, control circuitry 124 may retrieve a list of nodes 114 to receive a copy of the video stream transmitted by control circuitry 124 from main facility 102. In general, this list of nodes 114 may be defined as part of a distribution profile group, which may be stored within a node subscription database (e.g., within main facility 102 (FIG. 1), media content source 516 (FIG. 5), or media guidance data source 518 (FIG. 5)).

Process 1100 continues to 1106, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) determines whether there is a previously stored time offset for the next node in the list (e.g., stored within offset database 122, which may be optionally stored within main facility 102 (FIG. 1), media content source 516, or media guidance data source 518 (FIG. 5)). For example, control circuitry 124 may search offset database 122 for any time offsets associated with a given node. If there is a time offset already stored in the offset database 122, control circuitry 124 may retrieve the time offset directly from the offset database 122, and process 1100 proceeds to 1110. Alternately, if there is no time offset for a given node, process 1100 proceeds to 1108.

Process 1100 may continue to 1108, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) generates a time offset for the node. For example, if control circuitry 124 determines that there is previously stored time offset for node 118-1, control circuitry 124 may determine a time offset for node 118-1 by receiving a fingerprint of a video frame from a video stream transmitted by node 118-1 at a first time, and comparing the fingerprint to a previously stored fingerprint in fingerprint database 120 for a video frame of a video stream transmitted to node 118-1 at a second time. In general, control circuitry 124 may incorporate sub-processes 602-608 from process 600 (FIG. 6), or sub-processes 702-712 from process 700 (FIG. 7), in order to determine a time offset for a given node. Afterwards, process 1100 continues to 1110.

Process 1100 continues to 1110, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) transmits a request to the node (e.g., node 114-1 (FIG. 1) via communication path 104 (FIG. 1) or communication path 520 (FIG. 5)) to generate a fingerprint based on the time offset and the transmission time. For example, if the transmission time is "8:00:00 pm," and the time offset is twenty seconds, control circuitry 124 may transmit a request for node 114-1 to generate a fingerprint from a video frame being transmitted from the node 114-1 to end user 116-1 at a predetermined transmission time of "8:00:20 pm."

Process 1100 continues to 1112, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) determines whether there are additional nodes in the list. For example, if control circuitry 124 retrieved a list of nodes including nodes 114-1 and 114-2 at 1104 from media guidance data source 518, control circuitry 124 may determine if requests have been transmitted to both nodes 114-1 and 114-2. If there are additional nodes on the list that control circuitry 124 needs to submit requests to, process 1100 proceeds to 1106 where control circuitry 124 determines if the next node in the list has a previously stored time offset. Alternately, if control circuitry 124 has transmitted requests to all of the nodes on the list, process 1100 proceeds to 1114.

Process 1100 continues to 1114, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) monitors for fingerprints from the nodes. For example, if control circuitry 124 transmitted requests to both nodes 114-1 and 114-2, control circuitry 124 may wait to receive the requested fingerprints generated by both nodes 114-1 and 114-2. In general, control circuitry 124 may receive the fingerprints through any suitable communication path (e.g., communication path 104 (FIG. 1), or communication path 520 or 522 via communication network 514 (FIG. 5)), and may monitor the communication path for communications from nodes 114-1 and 114-2.

Process 1100 continues to 1116, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) determines whether the control circuitry has received the fingerprints from each of the nodes at the predetermined transmission times. For example, control circuitry 124 may determine whether it has received the requested fingerprints from both nodes 114-1 and 114-2. If control circuitry 124 has received all of the fingerprints from all of the nodes, process 1100 proceeds to 1118. Otherwise, if control circuitry 124 has not received all of the fingerprints yet, process 1100 proceeds to 1114 where control circuitry 124 continues to monitor for receipt of the fingerprints.

After the fingerprints have been received, process 1100 continues to 1118, where control circuitry (e.g., control circuitry 124 operating within main facility 102 (FIG. 1), control circuitry 402 (FIG. 4), or control circuitry distributed throughout any of the hardware and systems discussed in relation to FIG. 1, FIG. 4, or FIG. 5) generates alerts for each of the nodes. For example, control circuitry 124 may generate alerts based on the received fingerprints using any of the systems or methods discussed in relation to FIG. 8 or FIG. 9. For instance, control circuitry 124 may compare the received fingerprint from each node to a reference fingerprint generated based on a video frame from the video stream transmitted by control circuitry 124 to each of the nodes. Control circuitry 124 may then determine if the fingerprints from the nodes match the reference fingerprint. If the fingerprint from a given node matches the reference fingerprint, control circuitry 124 may generate a first alert indicating that the given node retransmitted the video stream (e.g., similar to sub-process 808 of process 800 (FIG. 8)). Alternately, if the fingerprint from a given node does not match the reference fingerprint, control circuitry 124 may generate a second alert indicating that the given node failed to retransmit the video stream (e.g., similar to sub-process 810 of process 800 (FIG. 8)).

It is contemplated that any of the processes or individual procedures discussed in relation to FIGS. 6-11 may be combined with one another, including processes 600, 700, 800, 900, 1000, and 1100, and any of the individual procedures discussed in relation to processes 600, 700, 800, 900, 1000, and 1100. Moreover, any of the procedures or descriptions discussed in relation to FIGS. 6-11 may be used with any other embodiment of this disclosure. For example, control circuitry may receive fingerprints in response to the requests generated by process 600 (FIG. 6) or process 700 (FIG. 7), and may use these fingerprints to generate any of the various alerts discussed in relation to FIG. 8, and any of the alerts generated in connection with process 800 (FIG. 8) may result in performing at least a portion of process 900 (FIG. 9) or 1000 (FIG. 10). For instance, process 900 may be performed as part of generating the second alert at sub-process 810 of process 800 (FIG. 8), and process 1000 may be performed as part of generating the first alert at sub-process 808 of process 800 (FIG. 8), which in turn may be generated based on a fingerprint received in response to the requests generated by process 600 (FIG. 6) or process 700 (FIG. 7). As an alternate example, process 1100 (FIG. 11) may incorporate portions of process 600 or process 700 in order to generate time offsets at 1108 or transmit requests at 1110. In addition, the procedures and descriptions described in relation to FIGS. 6-11 may be done in alternative orders or in parallel to further the purposes of this disclosure. In general, this may reduce lag or increase the speed of the system or method. For illustrative purposes, processes 600, 700, 800, 900, 1000, and 1100 may be described as being performed by control circuitry 124. However, any portion of processes 600, 700, 800, 900, 1000, or 1100 may be performed by control circuitry 124 operating within main facility 102 (FIG. 1), control circuitry 402 (FIG. 4), control circuitry distributed throughout any of the hardware and systems discussed in relation to FIG. 1, FIG. 4, or FIG. 5, or any suitable combination thereof. Furthermore, it should be noted that any of the devices or equipment discussed in relation to FIG. 1, FIG. 4, or FIG. 5 could be used to perform one or more of the processes in FIGS. 6-11, including processes 600, 700, 800, 900, 1000, or 1100.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   transmitting, using a source device, a video stream to a node, the video stream comprising a plurality of video frames, wherein the node is configured to redistribute the video stream toward an end user device, and wherein the source device is distinct from the node;
   receiving, at the source device and from the node, a portion of a first video frame of the plurality of video frames, wherein the first video frame was redistributed by the node, and a first timestamp indicating a first transmission time of the node redistributing the first video frame;
   sampling the portion of the first video frame;
   determining, based on the sampling, one or more unique characteristics of the first video frame, wherein the one or more unique characteristics comprise a watermark in the sampled portion of the first video frame that uniquely identifies the first video frame from any other video frame;
   generating, using the watermark that uniquely identifies the first video frame from the one or more unique characteristics determined based on the sampling the portion of the first video frame, a first fingerprint of the first video frame;
   retrieving, using the source device and based on the first fingerprint, a second timestamp comprising a second transmission time indicative of a time when the first video frame was transmitted to the node;
   determining, using the source device and based on the first timestamp and the second timestamp, a time offset between the first transmission time and the second transmission time;
   transmitting, using the source device and to the node, an instruction that is configured to cause the node to generate a second fingerprint of a second video frame of the plurality of video frames at a scheduled time calculated by adding the time offset to a third transmission time indicative of the time when the second video frame was transmitted to the node;
   based at least in part on transmitting the instruction, receiving, from the node, the second fingerprint of the second video frame at the scheduled time;
   based at least in part on receiving the second fingerprint of the second video frame at the scheduled time, determining whether the second fingerprint matches a third fingerprint generated from a third video frame transmitted to the node at the second transmission time;
   based at least in part on determining that the second fingerprint matches the first fingerprint, generating a first alert indicating that the node has successfully redistributed the video stream; and
   based at least in part on determining that the second fingerprint does not match the first fingerprint, generating a second alert indicating that the node failed to redistribute the video stream.

2. A method for verifying broadcast transmissions, the method comprising:
   transmitting, using a source device, a video stream to a node, the video stream comprising a plurality of video frames, wherein the node is configured to redistribute the video stream toward an end user device, and wherein the source device is distinct from the node;
   receiving, at the source device and from the node, a portion of a first video frame of the plurality of video frames, wherein the first video frame was redistributed by the node, and a first timestamp indicating a first transmission time of the node redistributing the first video frame;
   sampling the portion of the first video frame;
   determining, based on the sampling, one or more unique characteristics of the first video frame, wherein the one or more unique characteristics comprise a watermark in the sampled portion of the first video frame that uniquely identifies the first video frame from any other video frame;
   generating, using the watermark that uniquely identifies the first video frame from the one or more unique characteristics determined based on the sampling the portion of the first video frame, a first fingerprint of the first video frame;
   accessing, using the source device, a database comprising a plurality of entries that corresponds to the plurality of video frames, wherein each entry of the plurality of entries comprises:
     (i) a fingerprint that was generated using a video frame of the plurality of video frames; and
     (ii) a timestamp corresponding to the fingerprint, wherein the timestamp comprises a transmission time indicative of a time when the video frame used to generate the fingerprint was transmitted to the node;
   identifying, using the source device and from the plurality of entries, a matching entry comprising a fingerprint that matches the first fingerprint;
   retrieving, using the source device and from the matching entry, a second timestamp comprising a second transmission time indicative of a time when the first video frame was transmitted to the node;
   determining, using the source device and based on the first timestamp and the second timestamp, a time offset between the first transmission time and the second transmission time;
   transmitting, using the source device and to the node, an instruction that is configured to cause the node to generate a second fingerprint of a second video frame of the plurality of video frames at a scheduled time calculated by adding the time offset to a third transmission time indicative of the time when the second video frame was transmitted to the node;

based at least in part on transmitting the instruction, receiving from the node, the second fingerprint of the second video frame at the scheduled time;

based at least in part on receiving the second fingerprint of the second video frame at the scheduled time, determining whether the second fingerprint matches a third fingerprint generated from a third video frame transmitted to the node at the second transmission time;

based at least in part on determining that the second fingerprint matches the first fingerprint, generating a first alert indicating that the node has successfully redistributed the video stream; and based at least in part on determining that the second fingerprint does not match the first fingerprint, generating a second alert indicating that the node failed to redistribute the video stream.

3. The method of claim 2, wherein:
the video stream is transmitted from the node to an end user through an intermediary node, a third timestamp is determined indicative of a third transmission time of the first video frame from the intermediary node toward the end user, and based on the first timestamp and the third timestamp, a relative time offset is determined between the first transmission time of the first video frame from the node and the third transmission time of the first video frame from the intermediary node toward the end user.

4. The method of claim 2, wherein the node is a first node, and wherein:
the video stream is simultaneously transmitted to the first node and a second node from a common source, wherein the first node transmits the video stream toward a first end user, and the second node transmits the video stream toward a second end user, a third timestamp is determined indicative of a third transmission time of the first video frame from the second node, and based on the first timestamp and the third timestamp, a relative time offset is determined between the first transmission time of the first video frame from the first node and the third transmission time of the first video frame from the second node.

5. The method of claim 2, wherein the video stream is transmitted over a first communication path, and wherein the generating the second alert comprises:
transmitting a request, to the node, to confirm receipt of the video stream;

based on transmitting the request to confirm receipt of the video stream, receiving a confirmation from the node;

determining whether the confirmation indicates that the node received the video stream; and in response to determining that the confirmation indicates that the node received the video stream, continuing to transmit the video stream over the first communication path; and in response to determining that the confirmation indicates that the node did not receive the video stream, transmitting the video stream to the node over a second communication path different from the first communication path, wherein the second communication path comprises a satellite communication.

6. The method of claim 2, wherein the generating the second alert comprises:
identifying, from the plurality of entries, a second matching entry comprising a fingerprint that matches the second fingerprint, the second matching entry comprising an identity of an associated media asset containing the respective associated video frame used to generate the respective fingerprint of the second matching entry;

retrieving, from the matching entry, the identity of the associated media asset; and storing the second alert in an alert record database, the second alert comprising data indicative of the identity of the associated media asset.

7. The method of claim 2, wherein the node is a first node, and wherein the transmitting of the video stream to the first node comprises:
identifying, from a node subscription database, one or more nodes in addition to the first node to which the video stream is to be transmitted; and simultaneously transmitting the video stream to each of the one or more nodes and the first node over a common communication path.

8. The method of claim 2, wherein the node is a first node, wherein the scheduled time is a first scheduled time, and wherein the time offset is a first time offset, the method further comprising:
transmitting the video stream to a second node simultaneously with the transmission to the first node;

transmitting, to the second node, an instruction configured to cause the second node to generate a fourth fingerprint of a fourth video frame transmitted by the second node at a second scheduled time calculated by adding a second time offset to the third transmission time;

in response to transmitting the instruction to the second node, receiving the fourth fingerprint of the fourth video frame transmitted by the second node at the second scheduled time;

determining whether the second fingerprint of the second video frame transmitted by the first node matches the fourth fingerprint of the fourth video frame transmitted by the second node;

in response to determining that the second fingerprint matches the fourth fingerprint, generating a third alert indicating that the first node and the second node made matching transmissions; and in response to determining that the second fingerprint does not match the fourth fingerprint, generating a fourth alert indicating that the first node and the second node did not make matching transmissions.

9. The method of claim 2, wherein the video stream is transmitted to the node over a first communication path, and wherein the identifying of the matching entry further comprises:
identifying, from the plurality of entries, a plurality of matching entries comprising a fingerprint that matches the first fingerprint, each matching entry of the plurality of matching entries including an indication of an associated communication path used to transmit the video frame that was used to generate the fingerprint in the each matching entry; and identifying, as the matching entry, an entry from the plurality of matching entries with an indication of an associated communication path that matches the first communication path used to transmit the video stream to the node.

10. The method of claim 2, wherein identifying the matching entry comprising the fingerprint that matches the first fingerprint comprises:
   determining one or more entries of the plurality of entries, each of the one or more entries corresponding to a video frame that was transmitted to the node at a time within a range of the first transmission time; and
   comparing the first fingerprint to fingerprints of the one or more entries to identify the matching entry comprising the fingerprint that matches the first fingerprint.

11. The method of claim 2, wherein the video stream is a first video stream, the method further comprising, in response to determining that the second fingerprint matches the first fingerprint:
   transmitting a second video stream to the node, wherein the second video stream comprises supplemental content.

12. The method of claim 2, wherein the one or more unique characteristics further comprise at least one of a channel logo or one or more spectral components, and wherein the first fingerprint is generated, at least in part, based on the at least one of the channel logo or the one or more spectral components.

13. A system for verifying broadcast transmissions, the system comprising:
   communications circuitry at a source device;
   storage circuitry; and
   control circuitry configured to:
      transmit, using the communications circuitry, a video stream to a node, the video stream comprising a plurality of video frames, wherein the node is configured to redistribute the video stream toward an end user device, and wherein the source device is distinct from the node;
      receive, using the communications circuitry and from the node, a portion of a first video frame of the plurality of video frames, wherein the first video frame was redistributed by the node, and a first timestamp indicating a first transmission time of the node redistributing the first video frame;
      sample the portion of the first video frame;
      determine, based on the sampling, one or more unique characteristics of the first video frame, wherein the one or more unique characteristics comprise a watermark in the sampled portion of the first video frame that uniquely identifies the first video frame from any other video frame;
      generate, using the watermark that uniquely identifies the first video frame from the one or more unique characteristics determined based on the sampling the portion of the first video frame, a first fingerprint of the first video frame;
      access a database comprising a plurality of entries that corresponds to the plurality of video frames, wherein each entry of the plurality of entries comprises:
         (i) a fingerprint that was generated using a video frame of the plurality of video frames; and
         (ii) a timestamp corresponding to the fingerprint, wherein the timestamp comprises a transmission time indicative of a time when the video frame used to generate the fingerprint was transmitted to the node;
      identify, from the plurality of entries, a matching entry comprising a fingerprint that matches the first fingerprint;
      retrieve, from the matching entry, a second timestamp comprising a second transmission time indicative of a time when the first video frame was transmitted to the node;
      determine, based on the first timestamp and the second timestamp, a time offset between the first transmission time and the second transmission time;
      transmit, using the communications circuitry and to the node, an instruction that is configured to cause the node to generate a second fingerprint of a second video frame of the plurality of video frames at a scheduled time calculated by adding the time offset to a third transmission time indicative of the time when the second video frame was transmitted to the node;
      based at least in part on transmitting the instruction, receive, using the communications circuitry and from the node, the second fingerprint of the second video frame at the scheduled time;
      based at least in part on receiving the second fingerprint of the second video frame at the scheduled time, determine whether the second fingerprint matches a third fingerprint generated from a third video frame transmitted to the node at the second transmission time;
      based at least in part on determining that the second fingerprint matches the first fingerprint, generate a first alert indicating that the node has successfully redistributed the video stream; and
      based at least in part on determining that the second fingerprint does not match the first fingerprint, generate a second alert indicating that the node failed to redistribute the video stream.

14. The system of claim 13, wherein:
   the video stream is transmitted from the node to an end user through an intermediary node,
   a third timestamp is determined indicative of a third transmission time of the first video frame from the intermediary node toward the end user, and
   based on the first timestamp and the third timestamp, a relative time offset is determined between the first transmission time of the first video frame from the node and the third transmission time of the first video frame from the intermediary node toward the end user.

15. The system of claim 13, wherein the node is a first node, and wherein:
   the video stream is simultaneously transmitted to the first node and a second node from a common source, wherein the first node transmits the video stream toward a first end user, and the second node transmits the video stream toward a second end user,
   a third timestamp is determined indicative of a third transmission time of the first video frame from the second node, and
   based on the first timestamp and the third timestamp, a relative time offset is determined between the first transmission time of the first video frame from the first node and the third transmission time of the first video frame from the second node.

16. The system of claim 13, wherein the video stream is transmitted over a first communication path, and wherein the control circuitry is configured to generate the second alert by being configured to:
   transmit a request to the node, using the communications circuitry, to confirm receipt of the video stream;

based on transmitting the request to confirm receipt of the video stream, receive a confirmation from the node using the communications circuitry;

determine whether the confirmation indicates that the node received the video stream; and in response to determining that the confirmation indicates that the node received the video stream, continue to transmit the video stream over the first communication path using the communications circuitry; and in response to determining that the confirmation indicates that the node did not receive the video stream, transmit the video stream to the node over a second communication path different from the first communication path using the communications circuitry.

17. The system of claim 13, wherein the control circuitry is configured to generate the second alert by being configured to:

identify, from the plurality of entries, a second matching entry comprising a fingerprint that matches the second fingerprint, the second matching entry comprising an identity of an associated media asset containing the respective associated video frame used to generate the respective fingerprint of the second matching entry;

retrieve, from the matching entry, the identity of the associated media asset; and store the second alert in an alert record database, the second alert comprising data indicative of the identity of the associated media asset.

18. The system of claim 13, wherein the node is a first node, and wherein the control circuitry is configured to transmit the video stream to the first node by being configured to:

identify, from a node subscription database, one or more nodes in addition to the first node to which the video stream is to be transmitted; and simultaneously transmit the video stream to each of the one or more nodes and the first node over a common communication path using the communications circuitry.

19. The system of claim 13, wherein the node is a first node, wherein the scheduled time is a first scheduled time, wherein the time offset is a first time offset, and wherein the control circuitry is further configured to:

transmit the video stream to a second node using the communications circuitry simultaneously with the transmission to the first node;

transmit, to the second node using the communications circuitry, an instruction configured to cause the second node to generate a fourth fingerprint of a fourth video frame transmitted by the second node at a second scheduled time calculated by adding a second time offset to the third transmission time;

in response to transmitting the instruction to the second node, receive, using the communications circuitry, the fourth fingerprint of the fourth video frame transmitted by the second node at the second scheduled time;

determine whether the second fingerprint of the second video frame transmitted by the first node matches the fourth fingerprint of the fourth video frame transmitted by the second node;

in response to determining that the second fingerprint matches the fourth fingerprint, generate a third alert indicating that the first node and the second node made matching transmissions; and in response to determining that the second fingerprint does not match the fourth fingerprint, generate a fourth alert indicating that the first node and the second node did not make matching transmissions.

20. The system of claim 13, wherein the video stream is transmitted to the node over a first communication path, and wherein the control circuitry is configured to identify the matching entry by being configured to:

identify, from the plurality of entries, a plurality of matching entries comprising a fingerprint that matches the first fingerprint, each matching entry of the plurality of matching entries including an indication of an associated communication path used to transmit the video frame that was used to generate the fingerprint in the each matching entry; and identify, as the matching entry, an entry from the plurality of matching entries with an indication of an associated communication path that matches the first communication path used to transmit the video stream to the node.

* * * * *